(12) United States Patent
Kondrad et al.

(10) Patent No.: US 12,108,082 B2
(45) Date of Patent: Oct. 1, 2024

(54) METHOD, AN APPARATUS AND A COMPUTER PROGRAM PRODUCT FOR VOLUMETRIC VIDEO ENCODING AND VIDEO DECODING

(71) Applicant: Nokia Technologies Oy, Espoo (FI)

(72) Inventors: Lukasz Kondrad, Munich (DE); Vinod Kumar Malamal Vadakital, Tampere (FI); Kimmo Roimela, Tampere (FI); Lauri Ilola, Tampere (FI); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 126 days.

(21) Appl. No.: 17/906,242

(22) PCT Filed: Mar. 5, 2021

(86) PCT No.: PCT/FI2021/050163
§ 371 (c)(1),
(2) Date: Sep. 13, 2022

(87) PCT Pub. No.: WO2021/186103
PCT Pub. Date: Sep. 23, 2021

(65) Prior Publication Data
US 2023/0129875 A1  Apr. 27, 2023

(30) Foreign Application Priority Data

Mar. 19, 2020 (FI) .................................... 20205280

(51) Int. Cl.
*H04N 19/597* (2014.01)
*H04N 19/172* (2014.01)

(52) U.S. Cl.
CPC ......... *H04N 19/597* (2014.11); *H04N 19/172* (2014.11)

(58) Field of Classification Search
CPC ........................... H04N 19/597; H04N 19/172
See application file for complete search history.

(56) References Cited

U.S. PATENT DOCUMENTS

| 2021/0211703 A1* | 7/2021 | Kim ..................... H04N 19/597 |
| 2022/0182670 A1* | 6/2022 | Kuma ..................... H04N 19/85 |
| 2023/0042874 A1* | 2/2023 | Dore ..................... H04N 21/816 |

FOREIGN PATENT DOCUMENTS

WO    2021/176133 A1    9/2021

OTHER PUBLICATIONS

"Information technology—Coded Representation of Immersive Media—Part 5: Video-based Point Cloud Compression", ISO/IEC JTC 1/SC 29/WG 11, ISO/IEC 23090-5, 2019, 102 pages.

(Continued)

*Primary Examiner* — Kyle M Lotfi
(74) *Attorney, Agent, or Firm* — Joseph C. Drish; Harrington & Smith

(57) ABSTRACT

The embodiments relate to a method comprising receiving as an input a volumetric video frame comprising volumetric video data (910); decomposing the volumetric video frame into one or more patches, wherein a patch comprises a volumetric video data component (920); packing several patches, where at least two patches of the several patches comprise a different volumetric video data component with respect to each other, into one video frame (930); generating a bitstream comprising an encoded video frame (940); signaling, in or along the bitstream, existence of encoded video frame containing patches of more than one different volumetric video data component (950); and transmitting the encoded bitstream to a storage for rendering (960). The embodiments also relate to a technical equipment for implementing the method.

25 Claims, 10 Drawing Sheets

(56) References Cited

OTHER PUBLICATIONS

"SurfaceTexture", developers, Retrieved on Sep. 22, 2022, Webpage available at : https://developer.android.com/reference/android/graphics/SurfaceTexture.
"The Video Embed element", MDN, Retrieved on Sep. 22, 2022, Webpage available at : https://developer.mozilla.org/en-US/docs/Web/HTML/Element/video.
"Defect report for HEVC (ISO/IEC 23008-2)", WG 11 (via JCT-VC), ISO/IEC JTC1/SC29/WG11, N18878, Oct. 11, 2019, pp. 1-10.
"Information technology—Coded representation of immersive media—Part 3: Versatile video coding", ISO/IEC JTC1/SC29/WG11, N18692, Text of ISO/IEC CD 23090-3, Jul. 12, 2019, 445 pages.
"High Efficiency Video Coding", Series H: Audiovisual And Multimedia Systems, Infrastructure of audiovisual services—Coding of moving video, Recommendation ITU-T H.265, Feb. 2018, 692 pages.
Office action received for corresponding Finnish Patent Application No. 20205280, dated Nov. 17, 2020, 9 pages.
"V-PCC Codec Description", 3DG, ISO/IEC JTC1/SC29/WG11, N18892, Nov. 13, 2019, 65 pages.
Pesonen et al., "[PCC] On Attiribute Coding (CE2.15)", Nokia, ISO/IEC JTC1/SC29/WG11 MPEG2018/ m44735, Oct. 2018, 10 pages.
"Working Draft 4 of Immersive Video", Video, ISO/IEC JTC1/SC29/WG11, N19001, Feb. 28, 2020, 69 pages.
"Information technology—Coded Representation of Immersive Media—Part 5: Video-based Point Cloud Compression", ISO/IEC JTC 1/SC 29/WG 11, ISO/IEC 23090-5, 2019, 209 pages.
International Search Report and Written Opinion received for corresponding Patent Cooperation Treaty Application No. PCT/FI2021/050163, dated Jun. 9, 2021, 15 pages.
Mammou et al., "Point Cloud Compression: Test Model Category 2 version 0.0", Apple Inc, ISO/IEC JTC1/SC29/WG11 m41920, Oct. 2017, 7 pages.

* cited by examiner

METHOD, AN APPARATUS AND A COMPUTER PROGRAM PRODUCT FOR VOLUMETRIC VIDEO ENCODING AND VIDEO DECODING

RELATED APPLICATION

This application claims priority to PCT Application No. PCT/FI2021/050163, filed on Mar. 5, 2021, which claims priority to Finnish Application No. 20205280, filed on Mar. 19, 2020, each of which is incorporated herein by reference in its entirety.

TECHNICAL FIELD

The present solution generally relates to volumetric video.

BACKGROUND

Since the beginning of photography and cinematography, the most common type of image and video content has been captured by cameras with relatively narrow field of view and displayed as a rectangular scene on flat displays. The cameras are mainly directional, whereby they capture only a limited angular field of view (the field of view towards which they are directed).

More recently, new image and video capture devices are available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

For volumetric video, a scene may be captured using one or more 3D (three-dimensional) cameras. The cameras are in different positions and orientations within a scene. One issue to consider is that compared to 2D (two-dimensional) video content, volumetric 3D video content has much more data, so viewing it requires lots of bandwidth (with or without transferring it from a storage location to a viewing device): disk I/O, network traffic, memory bandwidth, GPU (Graphics Processing Unit) upload. Capturing volumetric content also produces a lot of data, particularly when there are multiple capture devices used in parallel.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method, comprising receiving as an input a volumetric video frame comprising volumetric video data; decomposing the volumetric video frame into one or more patches, wherein a patch comprises a volumetric video data component; packing several patches, where at least two patches of the several patches comprise a different volumetric video data component with respect to each other, into one video frame; generating a bitstream comprising an encoded video frame; signaling, in or along the bitstream, existence of encoded video frame containing patches of more than one different volumetric video data component; and transmitting the encoded bitstream to a storage for rendering.

According to a second aspect, there is provided an apparatus comprising at least means for receiving as an input a volumetric video frame comprising volumetric video data; means for decomposing the volumetric video frame into one or more patches, wherein a patch comprises a volumetric video data component; means for packing several patches, where at least two patches of the several patches comprise a different volumetric video data component with respect to each other, into one video frame; means for generating a bitstream comprising an encoded video frame; means for signaling, in or along the bitstream, existence of encoded video frame containing patches of more than one different volumetric video data component; and means for transmitting the encoded bitstream to a storage for rendering.

According to a third aspect, there is provided an apparatus comprising at least one processor, memory including computer program code, the memory and the computer program code configured to, with the at least one processor, cause the apparatus to perform at least the following: receive as an input a volumetric video frame comprising volumetric video data; decompose the volumetric video frame into one or more patches, wherein a patch comprises a video data component; pack several patches, where at least two patches of the several patches comprise a different volumetric video data component with respect to each other, into one video frame; generate a bitstream comprising an encoded video frame; signal, in or along the bitstream, existence of encoded video frame containing patches of more than one different volumetric video data component; and transmit the encoded bitstream to a storage for rendering.

According to a fourth aspect, there is provided a computer program product comprising computer program code configured to, when executed on at least one processor, cause an apparatus or a system to: receive as an input a volumetric video frame comprising volumetric video data; decompose the volumetric video frame into one or more patches, wherein a patch comprises a video data component; pack several patches, where at least two patches of the several patches comprise a different volumetric video data component with respect to each other, into one video frame; generate a bitstream comprising an encoded video frame; signal, in or along the bitstream, existence of encoded video frame containing patches of more than one different volumetric video data component; and transmit the encoded bitstream to a storage for rendering.

According to an embodiment, a volumetric video data component comprise one of the following: geometry data, attribute data.

According to an embodiment, said signaling is configured to be provided in at least one structure of V-PCC bitstream.

According to an embodiment, the bitstream comprises an a signal indicating a linkage between atlas data and packed video data.

According to an embodiment, an apparatus further comprises means for encoding a type of the video data component into a bitstream of a patch.

According to an embodiment, an apparatus further comprises means for mapping a patch to video packing regions signaled in the bitstream.

According to an embodiment, an apparatus further comprises means for indicating in a bitstream that a video bitstream contains a number of packed attributes.

According to an embodiment, the attribute comprises one of the following: texture, material identification, transparency, reflectance, normal.

According to an embodiment, an apparatus further comprises means for encoding into a bitstream an indication on how patches are differentiated and linked together.

According to an embodiment, an apparatus further comprises means for generating a structure comprising information about packing regions.

According to an embodiment, an apparatus further comprises means for encoding a video frame as separate color planes.

According to an embodiment, an apparatus further comprises means for encoding into a bitstream information about codec being used for encoding the video frame.

According to an embodiment, an apparatus further comprises means for generating a structure identifying an encoded bitstream to which a metadata is related to.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

In the following, several embodiments will be described in the context of volumetric video encoding and decoding. In particular, the several embodiments enable packing and signaling volumetric video in one video component.

Figure 1:
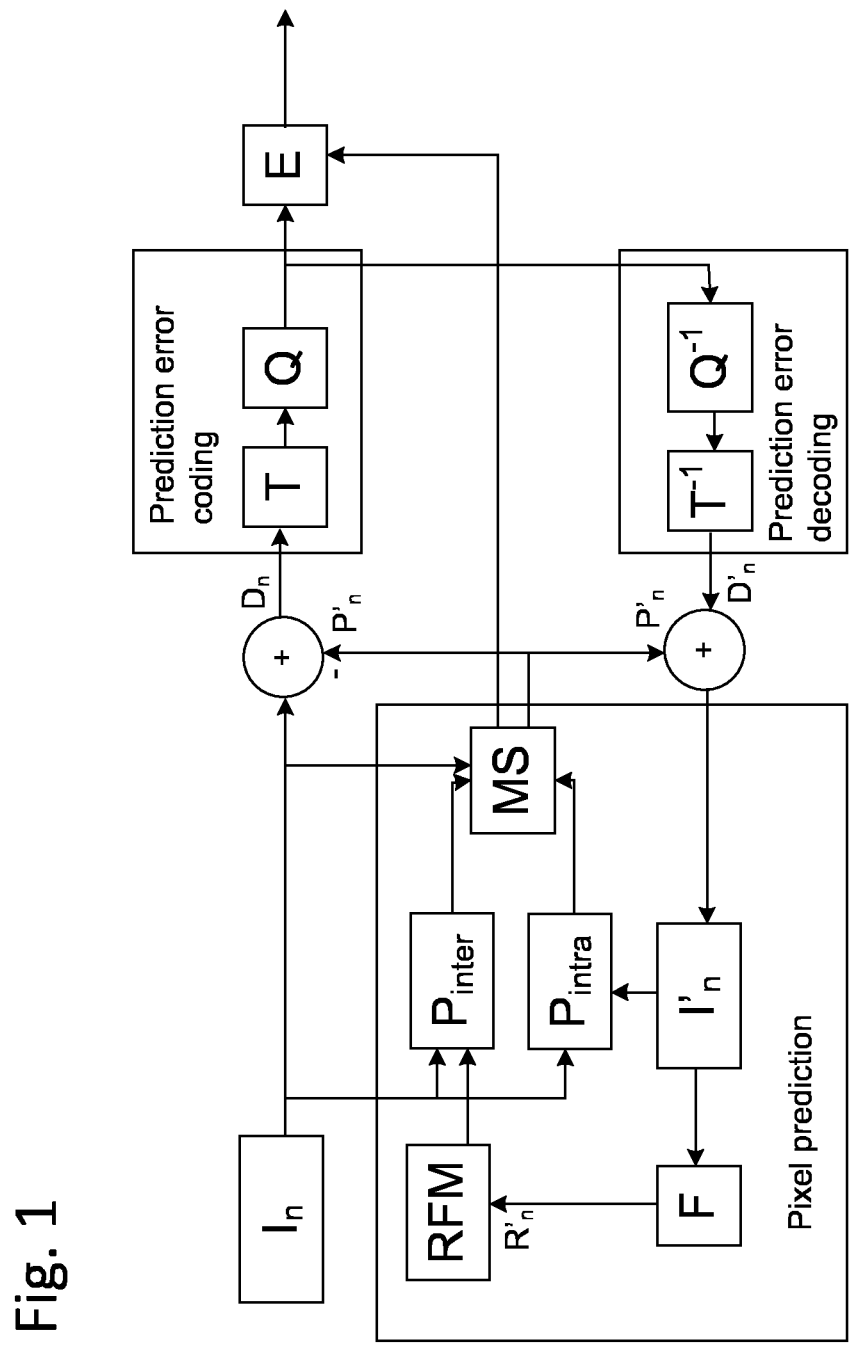
FIG. 1 shows an example of an encoding process.
Figure 2:
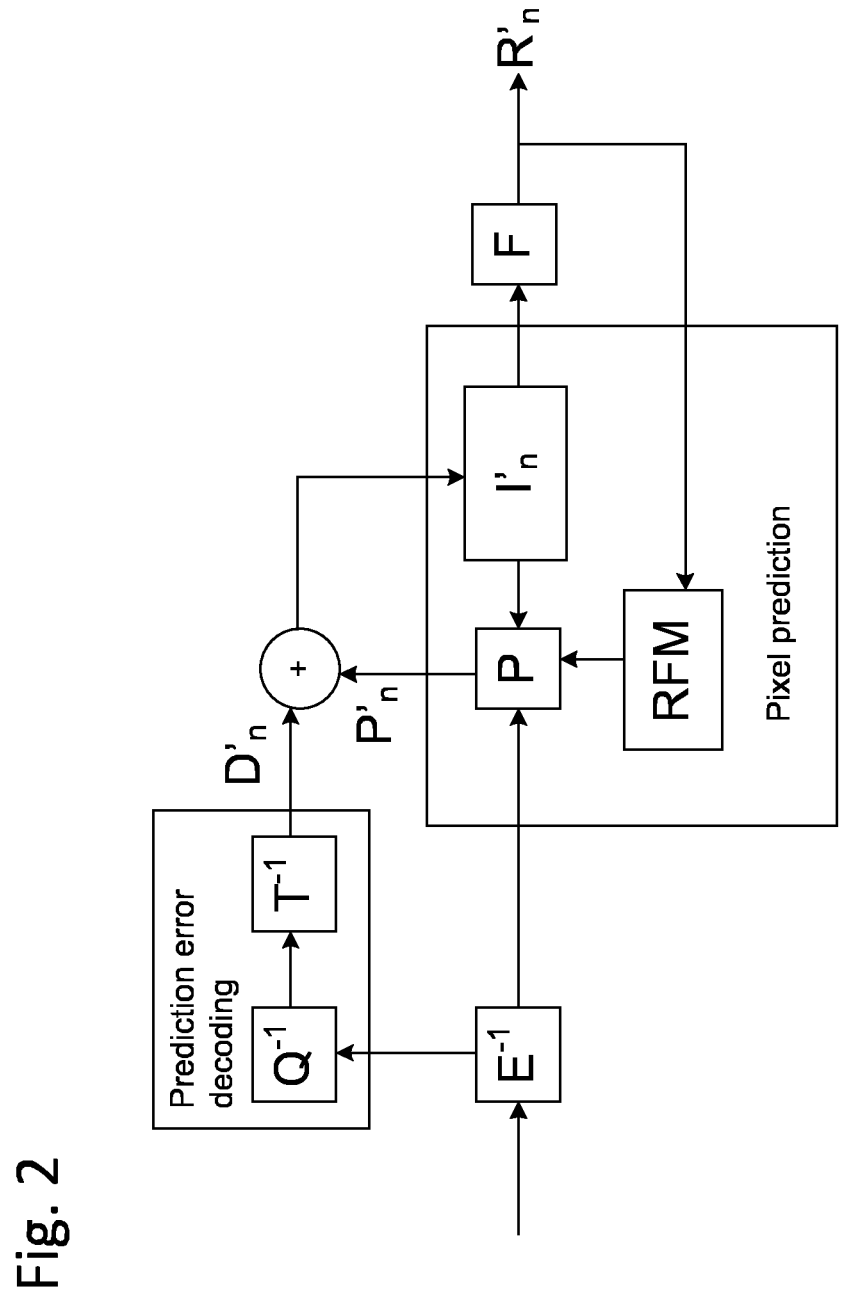
FIG. 2 shows an example of a decoding process.

A video codec comprises an encoder that transforms the input video into a compressed representation suited for storage/transmission, and a decoder that can un-compress the compressed video representation back into a viewable form. An encoder may discard some information in the original video sequence in order to represent the video in a more compact form (i.e. at lower bitrate). FIG. 1 illustrates an encoding process of an image as an example. FIG. 1 shows an image to be encoded ($I_n$); a predicted representation of an image block ($P'_n$); a prediction error signal ($D_n$); a reconstructed prediction error signal ($D'_n$); a preliminary reconstructed image ($I'_n$) a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F). An example of a decoding process is illustrated in FIG. 2. FIG. 2 illustrates a predicted representation of an image block ($P'_n$); a reconstructed prediction error signal ($D'_n$); a preliminary reconstructed image ($I'_n$) a final reconstructed image ($R'_n$); an inverse transform ($T^{-1}$); an inverse quantization ($Q^{-1}$); an entropy decoding ($E^{-1}$); a reference frame memory (RFM); a prediction (either inter or intra) (P); and filtering (F).

Volumetric video refers to a visual content that may have been captured using one or more three-dimensional (3D) cameras. When multiple cameras are in use, the captured footage is synchronized so that the cameras provide different viewpoints to the same world. In contrast to traditional 2D/3D video, volumetric video describes a 3D model of the world where the viewer is free to move and observe different parts of the world.

Volumetric video enables the viewer to move in six degrees of freedom (6DOF): in contrast to common 360° video, where the user has from 2 to 3 degrees of freedom (yaw, pitch, and possibly roll), a volumetric video represents a 3D volume of space rather than a flat image plane. Volumetric video frames contain a large amount of data because they model the contents of a 3D volume instead of just a two-dimensional (2D) plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstruction techniques such as structure from motion, or captured with a combination of cameras and depth sensors such as LiDAR (Light Detection and Ranging), for example.

Volumetric video data represents a three-dimensional scene or object, and can be used as input for AR (Augmented Reality), VR (Virtual Reality) and MR (Mixed Reality) applications. Such data describes geometry (shape, size, position in three-dimensional space) and respective attributes (e.g. color, opacity, reflectance, . . . ), plus any possible temporal changes of the geometry and attributes at given time instances (like frames in two-dimensional (2D) video). Volumetric video is either generated from three-dimensional (3D) models, i.e. CGI (Computer Generated Imagery), or captured from real-world scenes using a variety of capture solutions, e.g. multi-camera, laser scan, combination of video and dedicated depth sensors, and more. Also, a combination of CGI and real-world data is possible. Representation formats for such volumetric data comprises triangle meshes, point clouds, or voxel. Temporal information about the scene can be included in the form of individual capture instances, i.e. volumetric video frame.

Because volumetric video describes a 3D scene (or object), such data can be viewed from any viewpoint. Therefore, volumetric video is an important format for any AR, VR or MR applications, especially for providing 6DOF viewing capabilities.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is coding this 3D data as a set of texture and depth map as is the case in the multi-view plus depth. Closely related to the techniques used in multi-view plus depth is the use of elevation maps, and multi-level surface maps.

In dense point clouds or voxel arrays, the reconstructed 3D scene may contain tens or even hundreds of millions of points. If such representations are to be stored or interchanged between entities, then efficient compression becomes essential. Standard volumetric video representation formats, such as point clouds, meshes, voxel suffer from poor temporal compression performance. Identifying correspondences for motion-compensation in 3D space is an ill-defined problem, as both the geometry and respective attributes may change. For example, temporal successive "frames" do not necessarily have the same number of meshes, points or voxel. Therefore, compression of dynamic 3D scenes may be inefficient. 2D-video based approaches for compressing volumetric data, i.e. multiview and depth, have much better compression efficiency, but rarely cover the full scene. Therefore, they provide only limited 6DOF capabilities.

Instead of the above-mentioned approach, a 3D scene, represented as meshes, points, and/or voxel, can be projected onto one, or more geometries. These geometries are "unfolded" onto 2D planes (two planes per geometry: one for texture, one for depth), which may be then encoded using standard 2D video compression techniques. Relevant projection geometry information is transmitted alongside the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with highly efficient temporal compression. Thus, coding efficiency may be increased greatly. Using geometry-projections instead of prior-art 2D-video based approaches, i.e. multiview and depth, provide a better coverage of the scene (or object). Thus, 6DOF capabilities may be improved. Using several geometries for individual objects improves the coverage of the scene further. Furthermore, standard video encoding hardware can be utilized for real-time compression/decompression of the projected planes. The projection and reverse projection steps are of low complexity.

Figure 3:
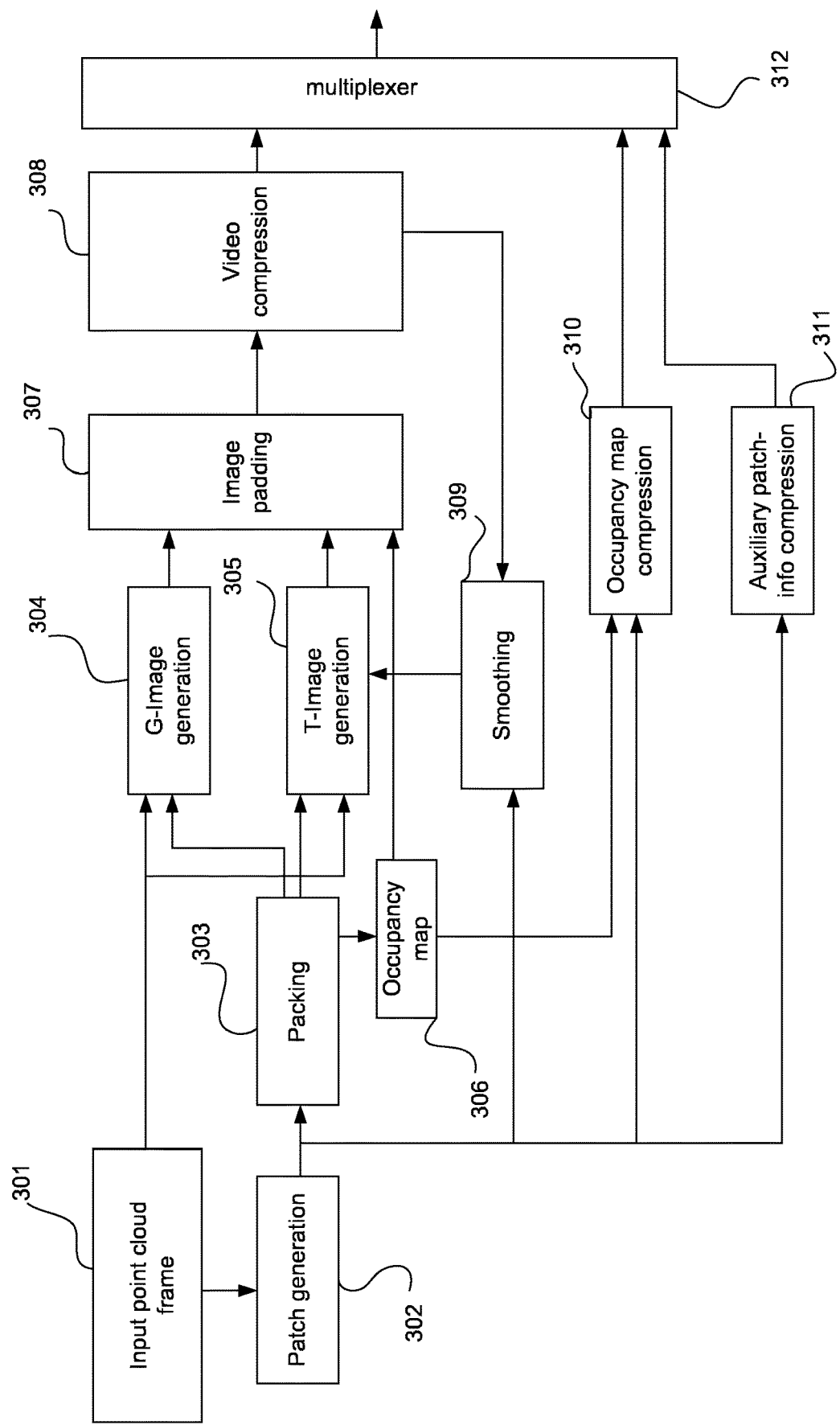
FIG. 3 shows an example of a volumetric video compression process.

FIG. 3 illustrates an overview of an example of a compression process of a volumetric video. Such process may be applied for example in MPEG Point Cloud Coding (PCC). The process starts with an input point cloud frame 301 that is provided for patch generation 302, geometry image generation 304 and texture image generation 305.

The patch generation 302 process aims at decomposing the point cloud into a minimum number of patches with smooth boundaries, while also minimizing the reconstruction error. For patch generation, the normal at every point can be estimated. An initial clustering of the point cloud can then be obtained by associating each point with one of the following six oriented planes, defined by their normals:

(1.0, 0.0, 0.0),
(0.0, 1.0, 0.0),
(0.0, 0.0, 1.0),
(−1.0, 0.0, 0.0),
(0.0, −1.0, 0.0), and
(0.0, 0.0, −1.0)

More precisely, each point may be associated with the plane that has the closest normal (i.e. maximizes the dot product of the point normal and the plane normal).

The initial clustering may then be refined by iteratively updating the cluster index associated with each point based on its normal and the cluster indices of its nearest neighbors. The final step may comprise extracting patches by applying a connected component extraction procedure.

Patch info determined at patch generation 302 for the input point cloud frame 301 is delivered to packing process 303, to geometry image generation 304 and to texture image generation 305. The packing process 303 aims at mapping the extracted patches onto a 2D plane, while trying to minimize the unused space, and guaranteeing that every T×T (e.g. 16×16) block of the grid is associated with a unique patch. It should be noticed that T may be a user-defined parameter. Parameter T may be encoded in the bitstream and sent to the decoder.

The used simple packing strategy iteratively tries to insert patches into a W×H grid. W and H may be user-defined parameters, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current resolution image can fit a patch, then the height H of the grid may be temporarily doubled, and search is applied again. At the end of the process, H is clipped so as to fit the used grid cells.

The geometry image generation 304 and the texture image generation 305 are configured to generate geometry images and texture images respectively. The image generation process may exploit the 3D to 2D mapping computed during the packing process to store the geometry and texture of the point cloud as images. In order to better handle the case of multiple points being projected to the same pixel, each patch may be projected onto two images, referred to as layers. For example, let H(u, y) be the set of points of the current patch that get projected to the same pixel (u, v). The first layer, also called a near layer, stores the point of H(u, v) with the lowest depth D0. The second layer, referred to as the far layer, captures the point of H(u, v) with the highest depth within the interval [D0, D0+$\Delta$], where $\Delta$ is a user-defined parameter that describes the surface thickness. The generated videos may have the following characteristics:

Geometry: W×H YUV420-8 bit,
Texture: W×H YUV420-8 bit,

It is to be noticed that the geometry video is monochromatic. In addition, the texture generation procedure exploits the reconstructed/smoothed geometry in order to compute the colors to be associated with the re-sampled points.

The geometry images and the texture images may be provided to image padding 307. The image padding 307 may also receive as an input an occupancy map (OM) 306 to be used with the geometry images and texture images. The occupancy map 306 may comprise a binary map that indicates for each cell of the grid whether it belongs to the empty space or to the point cloud. In other words, the occupancy map (OM) may be a binary image of binary values where the occupied pixels and non-occupied pixels are distinguished and depicted respectively. The occupancy map may alternatively comprise a non-binary image allowing additional information to be stored in it. Therefore, the representative values of the DOM (Deep Occupancy Map) may comprise binary values or other values, for example integer values. It should be noticed that one cell of the 2D grid may produce a pixel during the image generation process. Such an occupancy map may be derived from the packing process 303.

The padding process 307, for which the present embodiment are related, aims at filling the empty space between patches in order to generate a piecewise smooth image suited for video compression. For example, in a simple padding strategy, each block of T×T (e.g. 16×16) pixels is compressed independently. If the block is empty (i.e. unoccupied, i.e. all its pixels belong to empty space), then the pixels of the block are filled by copying either the last row or column of the previous T×T block in raster order. If the block is full (i.e. occupied, i.e., no empty pixels), nothing is done. If the block has both empty and filled pixels (i.e. edge block), then the empty pixels are iteratively filled with the average value of their non-empty neighbors.

The padded geometry images and padded texture images may be provided for video compression 308. The generated images/layers may be stored as video frames and compressed using for example the H.265 video codec according to the video codec configurations provided as parameters. The video compression 308 also generates reconstructed geometry images to be provided for smoothing 309, wherein a smoothed geometry is determined based on the reconstructed geometry images and patch info from the patch generation 302. The smoothed geometry may be provided to texture image generation 305 to adapt the texture images.

The patch may be associated with auxiliary information being encoded/decoded for each patch as metadata. The auxiliary information may comprise index of the projection plane, 2D bounding box, 3D location of the patch.

For example, the following metadata may be encoded/decoded for every patch:
  index of the projection plane
    Index 0 for the planes (1.0, 0.0, 0.0) and (−1.0, 0.0, 0.0)
    Index 1 for the planes (0.0, 1.0, 0.0) and (0.0, −1.0, 0.0)
    Index 2 for the planes (0.0, 0.0, 1.0) and (0.0, 0.0, −1.0)
  2D bounding box (u0, v0, u1, v1)
  3D location (x0, y0, z0) of the patch represented in terms of depth $\delta 0$, tangential shift s0 and bitangential shift r0. According to the chosen projection planes, ($\delta 0$, s0, r0) may be calculated as follows:
    Index 0, $\delta 0$=x0, s0=z0 and r0=y0
    Index 1, $\delta 0$=y0, s0=z0 and r0=x0
    Index 2, $\delta 0$=z0, s0=x0 and r0=y0

Also, mapping information providing for each T×T block its associated patch index may be encoded as follows:
  For each T×T block, let L be the ordered list of the indexes of the patches such that their 2D bounding box contains that block. The order in the list is the same as the order used to encode the 2D bounding boxes. L is called the list of candidate patches.
  The empty space between patches is considered as a patch and is assigned the special index 0, which is added to the candidate patches list of all the blocks.
  Let I be index of the patch, which the current T×T block belongs to, and let J be the position of I in L. Instead of explicitly coding the index I, its position J is arithmetically encoded instead, which leads to better compression efficiency.

An example of such patch auxiliary information is atlas data defined in ISO/IEC 23090-5.

The occupancy map consists of a binary map that indicates for each cell of the grid whether it belongs to the empty space or to the point cloud. One cell of the 2D grid produces a pixel during the image generation process.

The occupancy map compression 310 leverages the auxiliary information described in previous section, in order to detect the empty T×T blocks (i.e. blocks with patch index 0). The remaining blocks may be encoded as follows: The occupancy map can be encoded with a precision of a B0×B0 blocks. B0 is a configurable parameter. In order to achieve lossless encoding, B0 may be set to 1. In practice B0=2 or B0=4 results in visually acceptable results, while significantly reducing the number of bits required to encode the occupancy map.

The compression process may comprise one or more of the following example operations:
  Binary values may be associated with B0×B0 sub-blocks belonging to the same T×T block. A value 1 associated with a sub-block, if it contains at least a non-padded pixel, and 0 otherwise. If a sub-block has a value of 1 it is said to be full, otherwise it is an empty sub-block.
  If all the sub-blocks of a T×T block are full (i.e., have value 1). The block is said to be full. Otherwise, the block is said to be non-full.
  A binary information may be encoded for each T×T block to indicate whether it is full or not.
  If the block is non-full, an extra information indicating the location of the full/empty sub-blocks may be encoded as follows:
  Different traversal orders may be defined for the sub-blocks, for example horizontally, vertically, or diagonally starting from top right or top left corner
  The encoder chooses one of the traversal orders and may explicitly signal its index in the bitstream.
  The binary values associated with the sub-blocks may be encoded by using a run-length encoding strategy.
    The binary value of the initial sub-block is encoded.
    Continuous runs of 0s and 1s are detected, while following the traversal order selected by the encoder.
    The number of detected runs is encoded.
    The length of each run, except of the last one, is also encoded.

Figure 4:
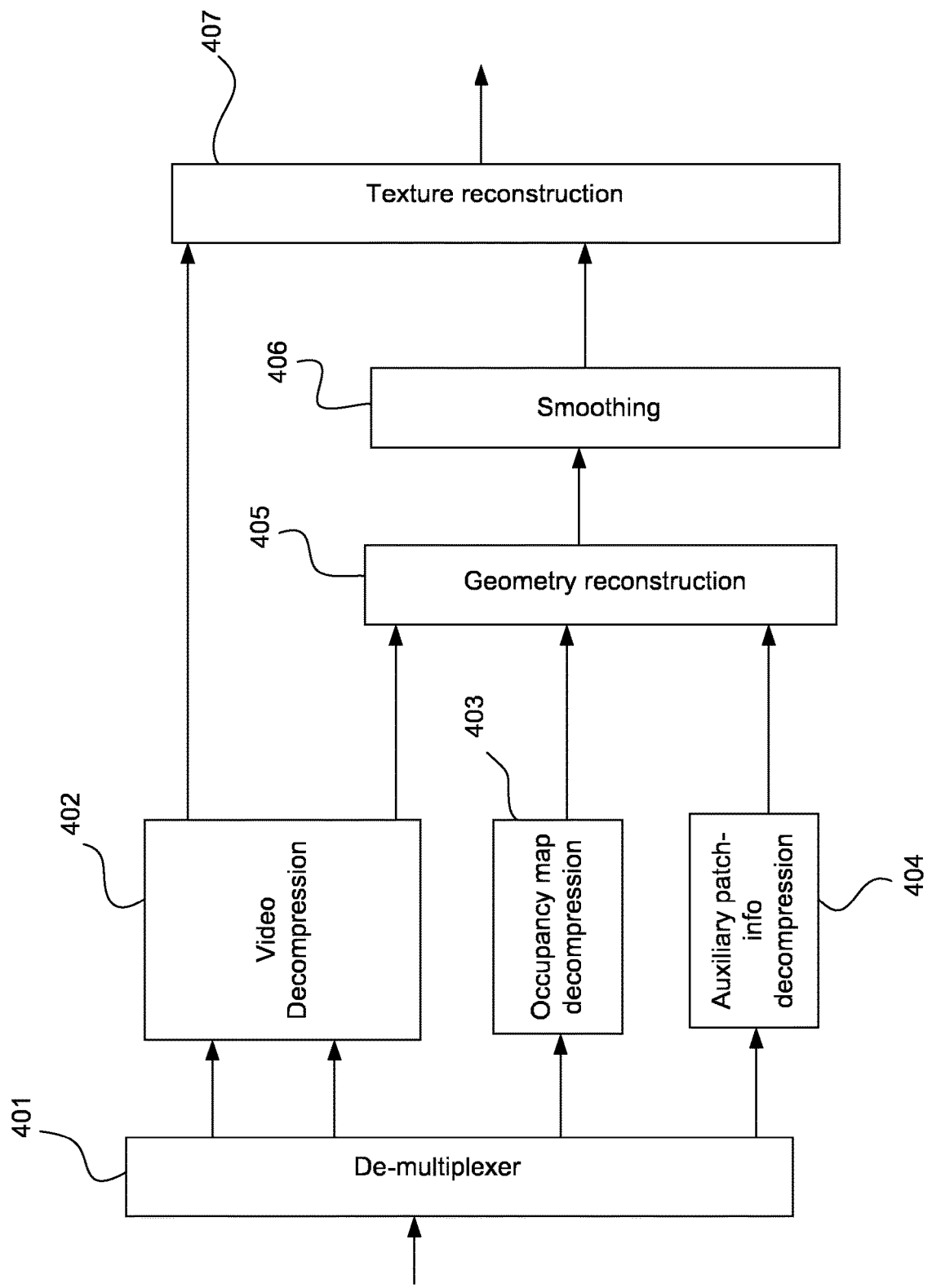
FIG. 4 shows an example of a volumetric video decompression process.

FIG. 4 illustrates an overview of a de-compression process for MPEG Point Cloud Coding (PCC). A de-multiplexer 401 receives a compressed bitstream, and after de-multiplexing, provides compressed texture video and compressed geometry video to video decompression 402. In addition, the de-multiplexer 401 transmits compressed occupancy map to occupancy map decompression 403. It may also transmit a compressed auxiliary patch information to auxiliary patch-info compression 404. Decompressed geometry video from the video decompression 402 is delivered to geometry reconstruction 405, as are the decompressed occupancy map and decompressed auxiliary patch information. The point cloud geometry reconstruction 405 process exploits the occupancy map information in order to detect the non-empty pixels in the geometry/texture images/layers. The 3D positions of the points associated with those pixels may be computed by leveraging the auxiliary patch information and the geometry images.

The reconstructed geometry image may be provided for smoothing 406, which aims at alleviating potential discontinuities that may arise at the patch boundaries due to compression artifacts. The implemented approach moves boundary points to the centroid of their nearest neighbors.

The smoothed geometry may be transmitted to texture reconstruction 407, which also receives a decompressed texture video from video decompression 402. The texture reconstruction 407 outputs a reconstructed point cloud. The texture values for the texture reconstruction are directly read from the texture images.

The point cloud geometry reconstruction process exploits the occupancy map information in order to detect the non-empty pixels in the geometry/texture images/layers. The 3D positions of the points associated with those pixels are computed by levering the auxiliary patch information and the geometry images. More precisely, let P be the point associated with the pixel (u, v) and let (δ0, s0, r0) be the 3D location of the patch to which it belongs and (u0, v0, u1, v1) its 2D bounding box. P can be expressed in terms of depth δ(u, v), tangential shift s(u, v) and bi-tangential shift r(u, v) as follows:

$$\delta(u,v) = \delta 0 + g(u,v)$$

$$s(u,v) = s0 - u0 + u$$

$$r(u,v) = r0 - v0 + v$$

where g(u, v) is the luma component of the geometry image.

For the texture reconstruction, the texture values can be directly read from the texture images. The result of the decoding process is a 3D point cloud reconstruction.

Visual volumetric video-based Coding (3VC) relates to a core part shared between MPEG V-PCC (Video-based Point Cloud Compression, ISO/IEC 23090-5) and MPEG MIV (MPEG Immersive Video, ISO/IEC 23090-12). In the highest level, 3VC metadata is carried in vpcc_unit, which consist of header and payload pairs. A general syntax for vpcc_unit structure is given below:

| | Descriptor |
|---|---|
| vpcc_unit( numBytesInVPCCUnit) { | |
|   vpcc_unit_header( ) | |
|   vpcc_unit_payload( ) | |
|   while( more_data_in_vpcc_unit) | |
|     trailing_zero_8bits /* equal to 0x00 */ | f(8) |
| } | |

A syntax for vpcc_unit_header being defined by the vpcc_unit is shown below:

| | Descriptor |
|---|---|
| vpcc_unit_header( ) { | |
|   vuh_unit_type | u(5) |
|   if vuh_unit_type == VPCC_AVD \|\| vuh_unit_type == VPCC_GVD \|\| | |
|     vuh_unit_type == VPCC_OVD \|\| vuh_unit_type == VPCC_AD) { | |
|     vuh_vpcc_parameter_set_id | u(4) |
|     vuh_atlas_id | u(6) |
|   } | |
|   if( vuh_unit_type == VPCC_AVD ) { | |
|     vuh_attribute_index | u(7) |
|     vuh_attribute_dimension_index | u(5) |
|     vuh_map_index | u(4) |
|     vuh_auxiliary_video_flag | u(1) |
|   } else if( vuh_unit_type == VPCC_GVD ) { | |
|     vuh_map_index | u(4) |
|     vuh_auxiliary_video_flag | u(1) |
|     vuh_reserved_zero_12bits | u(12) |
|   }else if( vuh_unit_type == VPCC_OVD \|\| vuh_unit_type == VPCC_AD) | |
|     vuh_reserved_zero_17bits | u(17) |
|   else | |
|     vuh_reserved_zero_27bits | u(27) |
| } | | vpcc_unit also defines vpcc_unit_payload, a syntax of which is presented below:

| | Descriptor |
|---|---|
| vpcc_unit_payload( ) { | |
|   if vuh_unit_type == VPCC_VPS ) | |
|     vpcc_parameter_set( ) | |
|   else if( vuh_unit_type == VPCC_AD ) | |
|     atlas_sub_bitstream( ) | |
|   else if( vuh_unit_type == VPCC_OVD \|\| | |
|     vuh_unit_type == VPCC_GVD | |
|     vuh_unit_type == VPCC_AVD) \|\| | |
|     video_sub_bitstream( ) | |
| } | |

3VC metadata is contained in atlas_sub_bitstream( ) which may contain a sequence of NAL units including header and payload data. nal_unit_header( ) is used to define how to process the payload data. NumBytesInNalUnit specifies the size of the NAL unit it bytes. This value (i.e. the size of the NAL unit it bytes) is required for decoding of the NAL unit. Some form of demarcation of NAL unit boundaries may be necessary to enable inference of NumBytesInNalUnit. One such demarcation method is specified in Annex C of V-PCC (ISO/IEC 23090-5) standard for the sample stream format.

3VC atlas coding layer (ACL) is specified to efficiently represent the content of the patch data. The NAL is specified to format such data and provide header information in a manner appropriate for conveyance on a variety of communication channel or storage media. All data is contained in NAL units, each of which contains an integer number of bytes. A NAL unit specifies a generic format for use in both packet-oriented and bitstream systems. The format of NAL units for both packet-oriented transport and sample streams is identical except that in the sample stream format specified in Annex C of V-PCC standard, each NAL unit can be preceded by an additional element that specifies the size of the NAL unit.

General NAL unit syntax is presented below:

| | Descriptor |
|---|---|
| nal_unit( NumBytesInNalUnit) { | |
|   nal_unit_header( ) | |

-continued

```
    NumBytesInRbsp = 0
    for( i = 2; i < NumBytesInNalUnit; i++ )
        rbsp_byte[ NumBytesInRbsp++ ]            b(8)
}
``` nal_unit defines nal_unit_header, a syntax of which is given below:

| nal_unit_header() { | Descriptor |
|---|---|
| nal_forbidden_zero_bit | f(1) |
| nal_unit_type | u(6) |
| nal_layer_id | u(6) |
| nal_temporal_id_plus1 | u(3) |
| } | |

In the nal_unit_header( ) syntax nal_unit_type specifies the type of the RBSP (Raw Byte Sequence Payload) data structure contained in the NAL unit as specified in Table 7.3 of V-PCC standard. nal_layer_id specifies the identifier of the layer to which an ACL NAL unit belongs or the identifier of a layer to which a non-ACL NAL unit applies. The value of nal_layer_id shall be n in the range of 0 to 62, inclusive. The value of 63 may be specified in the future by ISO/IEC. Decoders conforming to a profile specified in Annex A of the current version of V-PCC standard shall ignore (i.e., remove from the bitstream and discard) all NAL units with values of nal_layer_id not equal to 0.

rbsp_byte[i] is the i-th byte of an RBSP. An RBSP is specified as an ordered sequence of bytes as follows:

The RBSP contains a string of data bits (SODB) as follows:

if the SODB is empty (i.e., zero bits in length), the RBSP is also empty.

Otherwise, the RBSP contains the SODB as follows:
  The first byte of the RBSP contains the first (most significant, left-most) eight bits of the SODB; the next byte of the RBSP contains the next eight bits of the SODB, etc. until fewer than eight bits of the SODB remain.
  The rbsp_trailing_bits( ) syntax structure is present after the SODB as follows:
    The first (most significant, left-most) bits of the final RBSP byte contain the remaining bits of the SODB (if any).
    The next bit consists of a single bit equal to 1 (i.e., rbsp_stop_one_bit).
    When the rbsp_stop_one_bit is not the last bit of a byte-aligned byte, one or more bits equal to 0 (i.e. instances of rbsp_alignment_zero_bit) are present to result in byte alignment.
  One or more cabac_zero_word 16-bit syntax elements equal to 0x0000 may be present in some RBSPs after the rbsp_trailing_bits( ) at the end of the RBSP.

Syntax structures having these RBSP properties are denoted in the syntax tables using an "_rbsp" suffix. These structures are carried within NAL units as the content of the rbsp_byte[i] data bytes. As an example of a content:

atlas_sequence_parameter_set_rbsp( ) is used to carry parameters related to a sequence of 3VC frames.

atlas_frame_parameter_set_rbsp( ) is used to carry parameters related to a specific frame, and can be applied for a sequence of frames as well.

sei_rbsp( ) is used to carry SEI messages in NAL units.

atlas_tile_group_layer_rbsp( ) is used to carry patch layout information for tile groups.

When the boundaries of the RBSP are known, the decoder can extract the SODB from the RBSP by concatenating the bits of the bytes of the RBSP and discarding the rbsp_stop_one_bit, which is the last (least significant, right-most) bit equal to 1, and discarding any following (less significant, farther to the right) bits that follow it, which are equal to 0. The data necessary for the decoding process is contained in the SODB part of the RBSP.

In the following, some RBSP syntaxes are represented:

Syntax atlas_tile_group_rbsp is presented below:

| atlas_tile_group_layer_rbsp( ) { | Descriptor |
|---|---|
| atlas_tile_group_header( ) | |
| if( atgh_type != SKIP_TILE_GRP ) | |
| atlas_tile_group_data_unit( ) | |
| rbsp_trailing_bits( ) | |
| } | |

Syntax atlas_tile_group_header is presented below:

| atlas_tile_group_header( ) { | Descriptor |
|---|---|
| atgh_atlas_frame_parameter_set_id | ue(v) |
| atgh_address | u(v) |
| atgh_type | ue(v) |
| atgh_atlas_frm_order_ent_lsb | u(v) |
| if( asps_num_ref_atlas_frame_lists_in_asps > 0 ) | |
| atgh_ref_atlas_frame_list_sps_flag | u(1) |
| if( atgh_ref_atlas_frame_list_sps_flag == 0) | |
| ref_list_struct( asps_num_ref_atlas_frame_lists_in_asps ) | |
| else if( asps_num_ref_atlas_frame_lists_in_asps > 1 ) | |
| atgh_ref_atlas_frame_list_idx | u(v) |
| for( i = 0; j < NumLtrAtlasFrmEntries; i++ ) { | |
| atgh_additional_afoc_lsb_present_flag[ j ] | u(1) |
| if( atgh_additional_afoc_lsb_present_flag[ j ] ) | |
| atgh_additional_afoc_lsb_val[ j ] | u(v) |
| } | |
| if( atgh_type != SKIP_TILE_GRP ) { | |
| if( asps_normal_axis_limits_quantization_enabled_flag ) { | |
| atgh_pos_min_z_quantizer | u(5) |
| if( asps_normal_axis_max_delta_value_enabled_flag ) | |
| atgh_pos_delta_max_z_quantizer | u(5) |
| } | |
| if( asps_patch_size quantizer present flag ) { | |
| atgh_patch_size_x_info_quantizer | u(3) |
| atgh_patch_size_y_info_quantizer | u(3) |
| } | |
| if( afps_raw_3d_pos_bit_count_explicit_mode_flag) | |
| atgh_raw_3d_pos_axis_bit_count_minus1 | u(v) |
| if( atgh_type = = P_TILE_GRP && num_ref_entries_RlsIdx 1 > 1 ) { | |
| atgh_num_ref_idx_active_override_flag | u(1) |
| if( atgh_num_ref_idx_active_override_flag ) | |
| atgh_num_ref_idx_active_minus1 | ue(v) |
| } | |
| } | |
| byte_alignment( ) | |
| } | |

General atlas_tile_group_data_unit syntax is given below:

| atlas_tile_group_data_unit( ) { | Descriptor |
|---|---|
| p = 0 | |
| atgdu_patch_mode [ p ] | ue(v) |

-continued

| atlas_tile_group_data_unit( ) { | Descriptor |
|---|---|
|   while( atgdu_patch_mode[ p ] !=I_END && atgdu_patch_mode[ p ] != P_END){ | |
|     patch_information_data( p, atgdu_patch_mode[ p ] ) | |
|     p ++ | |
|     atgdu_patch_mode[ p ] | ue(v) |
|   } | |
|   AtgduTotalNumberOfPatches = p | |
|   byte_alignment( ) | |
| } | | patch_information_data syntax is defined as below:

| patch_information_data ( patchIdx, patchMode ) { | Descriptor |
|---|---|
|   if ( atgh_type = = SKIP_TILE_GR ) | |
|     skip_patch_data_unit( patchIdx) | |
|   else if ( atgh_type = = P_TILE_GR ) { | |
|     if(patchMode = = P_SKIP ) | |
|       skip_patch_data_unit( patchIdx) | |
|     else if(patchMode = = P_MERGE ) | |
|       merge_patch_data_unit( patchIdx ) | |
|     else if( patchMode = = P_INTRA ) | |
|       patch_data_unit( patchIdx ) | |
|     else if( patchMode = = P_INTER) | |
|       inter_patch_data_unit( patchIdx ) | |
|     else if( patchMode = = P_RAW ) | |
|       raw_patch_data_unit( patchIdx ) | |
|     else if( patchMode = = P_EOM ) | |
|       com_patch_data_unit( patchIdx ) | |
|   } | |
|   else if ( atgh_type = = I_TILE_GR ) { | |
|     if( patchMode = = I_INTRA ) | |
|       patch_data_unit( patchIdx ) | |
|     else if( patchMode = = I_RAW ) | |
|       raw_patch_data_unit( patchIdx ) | |
|     else if( patchMode = = I_EOM ) | |
|       com_patch_data_unit( patchIdx ) | |
|   } | |
| } | | patch_data_unit syntax is defined as follows:

| patch_data_unit( patchIdx ) { | Descriptor |
|---|---|
|   pdu_2d_pos_x[ patchIdx ] | u(v) |
|   pdu_2d_pos_y[ patchIdx ] | u(v) |
|   pdu_2d_delta_size_x[ patchIdx ] | se(v) |
|   pdu_2d_delta_size_y[ patchIdx ] | se(v) |
|   pdu_3d_pos_x[ patchIdx ] | u(v) |
|   pdu_3d_pos_y[ patchIdx ] | u(v) |
|   pdu_3d_pos_min_z[ patchIdx ] | u(v) |
|   if( asps_normal_axis_max_delta_value_enabled_flag ) | |
|     pdu_3d_pos_delta_max_z[ patchIdx ] | u(v) |
|   pdu_projection_id[ patchIdx ] | u(v) |
|   pdu_orientation_index[ patchIdx ] | u(v) |
|   if( afps_lod_mode_enabled_flag ) { | |
|     pdu_lod_enabled_flag[ patchIndex ] | u(1) |
|     if( pdu_lod_enabled_flag[ patchIndex ] > 0 ) { | |
|       pdu_lod_scale_x_minus1[ patchIndex ] | ue(v) |
|       pdu_lod_scale_y[ patchIndex ] | ue(v) |
|     } | |
|   } | u(v) |
|   if( asps_point_local_reconstruction_enabled_flag ) | |
|     point_local_reconstruction_data( patchIdx ) | |
| } | |

Annex F of 3VC V-PCC specification (ISO/IEC 23090-5) describes different SEI messages that have been defined. SEI messages assist in processes that relate to decoding, reconstruction, display, or other purposes. Annex F defines two types of SEI messages: essential and non-essential. 3VC SEI messages are signaled in sei_rspb( ) which is shown in below:

| sei_rbsp( ) { | Descriptor |
|---|---|
|   do | |
|     sei_message( ) | |
|   while( more_rbsp_data( ) ) | |
|   rbsp_trailing_bits( ) | |
| } | |

Non-essential SEI messages may not be required by the decoding process. Conforming decoders may not be required to process this information for output order conformance.

Specification for presence of non-essential SEI messages is also satisfied when those SEI messages (or some subset of them) are conveyed to decoders (or to the HRD (Hypothetical Reference Decoder)) by other means not specified in 3VC V-PCC specification. When present in the bitstream, non-essential SEI messages shall obey the syntax and semantics as specified in Annex F. When the content of a non-essential SEI message is conveyed for the application by some means other than presence within the bitstream, the representation of the content of the SEI message is not required to use the same syntax specified in Annex F. For the purpose of counting bits, only the appropriate bits that are actually present in the bitstream are counted.

Essential SEI messages are an integral part of the V-PCC bitstream and should not be removed from the bitstream. The essential SEI messages may be categorized into two types:

Type-A essential SEI messages: These SEI messages contain information required to check bitstream conformance and for output timing decoder conformance. Every V-PCC decoder conforming to point A should not discard any relevant Type-A essential SEI messages, and shall consider them for bitstream conformance and for output timing decoder conformance.

Type-B essential SEI messages: V-PCC decoders that wish to conform to a particular reconstruction profile should not discard any relevant Type-B essential SEI messages, and shall consider them for 3D point cloud reconstruction and conformance purposes.

As mentioned, visual volumetric video-based coding (3VC) is a new name for a common core part between ISO/IEC 23090-5 (formerly V-PCC) and ISO/IEC 23090-12 (formerly MIV). 3VC will not be issued as a separate document, but as part of ISO/IEC 23090-5 (expected to include clauses 1-8 of the current V-PCC text). ISO/IEC 23090-12 will refer to this common part. ISO/IEC 23090-5 will be renamed to 3VC PCC, ISO/IEC 23090-12 renamed to 3VC MIV.

Figure 5:
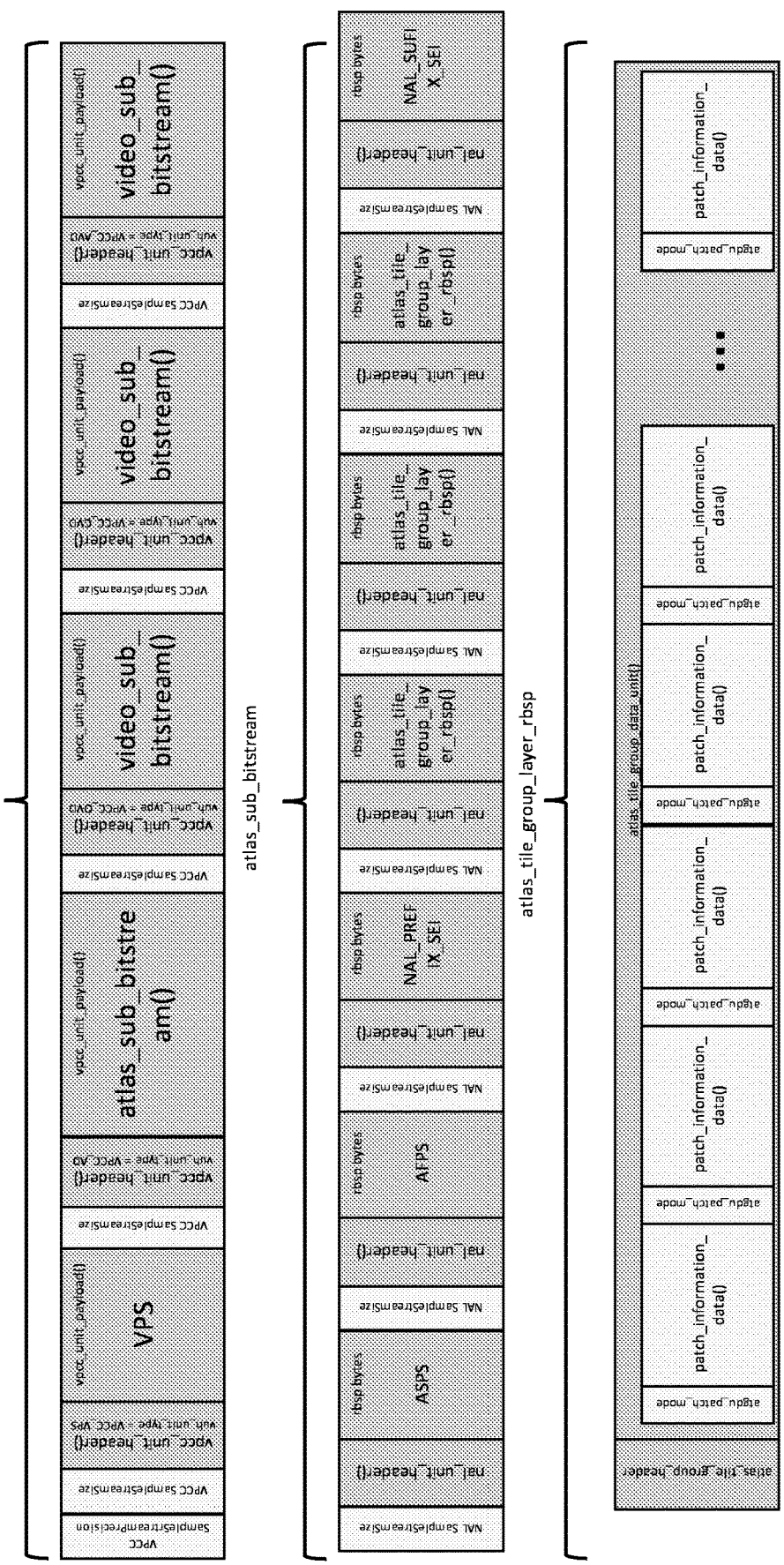
FIG. 5 shows an example of a visual volumetric video-based coding (3VC) bitstream.

3VC bitstream structure is shown as an example in FIG. 5. 3VC HLS (High Level Syntax) is utilized to encapsulate compressed volumetric video data, whether it is encoded by V-PCC or MIV standard. Both standards use similar concept of video data components plus metadata (comprising e.g. patch auxiliary information) and in both standards the video data may be encapsulated in at least two separate video bitstreams. That is occupancy and geometry video bitstreams in case of V-PCC, and geometry and texture video bitstreams in case of MIV. This separation has showed benefits in case of compression efficiency and especially in case of big volumetric scenes where the amount of patch data exceeds video encoder capability for one video frame.

However, use of multiple components may also create number of challenges on implementations. First, there may be a common problem how to synchronize multiple video bitstreams, especially in a situation, where a decoder skips a frame (as in the current Android APIs (Application Programming Interface) documentation, for example)

If a frame from any of the video bitstreams is skipped, volumetric video should not be reconstructed, unless copies of the reconstructed volumetric video frame or the decoded video frames are available. It is however understood that this requires extra copying of the data and therefore lower performance can be expected.

Another problem occurring in the implementation is memory requirements, because video decoders may allocate maximum required memory based on video bitstream tier and level values.

In addition, some of the current multimedia framework does not provide an interface that would support decoding or access to more than one video bitstream. For example, html <video> element provides an access to only one decoded frame at a time, even in a case, where there is more than one video track in a given file.

It is a purpose of the present embodiments to enable signaling and storage of patches from different video components in one video frame. A video component may be an occupancy, a geometry or an attribute. Examples of an attribute are texture, normal, reflectance. Thus, the purpose of the present embodiments is signaling and storage of patches from e.g. geometry and attribute (e.g. texture) in one video frame. It is also an aim to maintain compatibility within 3VC with regards to the V-PCC and MIV design. However, this should not be considered to be a limitation. The functionality provided by the present embodiments enable only one video data component when geometry and texture attribute are packed together, but the functionality can also be used to minimize the number of video data components caring attributes, when a number of attributes (e.g. texture, normal, transparency) are packed together.

V-PCC parameter set
Atlas data

-continued

Occupancy Video Data
Geometry Video Data
Attribute Video Data
Packed Video Data

The present embodiments are implemented by means of one or more of the following:
1. The present embodiments define a new vuh_unit_type and a new packed_video( ) structure for vpcc_parameter_set( ). In addition a new vpcc_unit_type is defined. The purpose of the packed_video( ) structure is to provide information about the packing regions.
2. The present embodiments also define a special use case where only attributes are packed in one video frame:
   A new identifier value is defined to indicate a decoder that there is a number of attributes packed in one video bitstream.
   A new SEI message provides information about the packing regions.
3. The present embodiments define a new packed_patches( ) syntax structure for atlas_sequence_parameter_set( ). This structure defines constraints on the tile groups of atlas to be aligned with regions of packed video. Patches can be mapped based on patch index in a given tile group. The structure gives a way of interpreting patches as 2D and 3D patches.
4. The present embodiments also define new patch modes in patch_information_data and new patch data unit structures. Patch data type can be signaled in a patch itself, or the patch may be mapped to video regions signaled in patched_video( ) structure (defined in item 1 above)
5. The present embodiments also define a new SEI message that leverages signaling separate patch layouts. Such SEI message is introduced to atlas_sub_bitstream( ) which signals the video track containing the patch. This feature enables flexibly signaling patches of different types.

Each of the previous elements of the present embodiments are discussed in more detailed manner in the following:
1. Vuh_Unit_Type and Packed_Video( ) Structure in Vpcc_Parameter_Set( ) Structure The purpose of the new vuh_unit_type is to indicate that VPCC unit contains a video bitstream containing patch data from different components. vuh_unit_type may have values from 0 to 5 as defined in the following table however vuh_unit_type may be composed differently.

| vuh_unit_type | Identifier | V-PCC Unit Type | Description |
|---|---|---|---|
| 0 | VPCC_VPS | V-PCC parameter set | V-PCC level parameters |
| 1 | VPCC_AD | Atlas data | Atlas information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5 | VPCC_PVD | Packed Video Data | Packed information |
| 6...31 | VPCC_RSVD | Reserved | — |

A new VPCC unit type vpcc_parameter_set( ) provides information on how the packed video frame should be interpreted. This is accomplished by defining a new extension mechanism that is signalled by vps_packed_video_extension_flag. When this flag is set, a packed_video( ) structure is provided in vpcc_parameter_set( ). In the following, an example of vpcc_parameter_set( ) structure is given:

| vpcc_parameter_set( ) { | Descriptor |
|---|---|
|   profile_tier_level( ) | |
|   vps_vpcc_parameter_set_id | u(4) |
|   vps_atlas_count_minus1 | u(6) |
|   for(j = 0; j < vps_atlas_count_minus1 + 1; j++ ) { | |
|     vps_frame_width[ j ] | u(16) |
|     vps_frame_height[ j ] | u(16) |
|     ... | |
|   } | |
|   vps_packed_video_extension_flag | u(1) |
|   if(vps_packed_video_extension_flag) | |
|     packed_video( ) | |
|   vps_extension_present_flag | u(1) |
|   if(vps_extension_present_flag) { | |
|     vps_extension_length_minus1 | ue(v) |
|     for( j = 0; j < vps_extension_length_minus1 + 1; j++ ) { | |
|       vps_extension_data_byte | u(8) |
|     } | |
|   } | |
|   byte_alignment( ) | |
| } | |

Figure 8A:
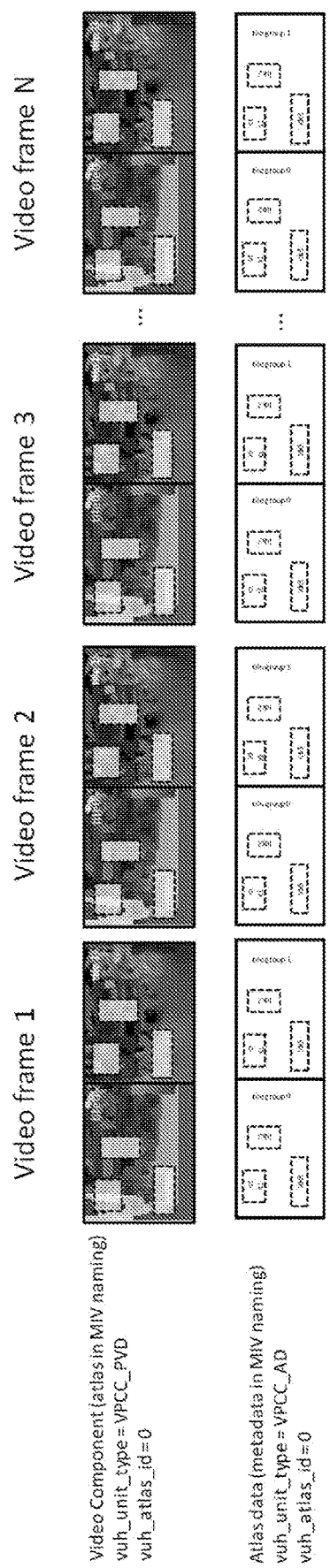
FIG. 8 shows examples on packed_video( ) and packed_patches( )

A new packed_video( ) structure provides the linkage between the atlas and the packed video bitstreams as well information about the components packed in a video bitstream and how to interpret them. FIG. 8a shows an example on packed_video( ) indicating how to interpret a video component. An example of packed_video( ) structure is shown below:

| packed_video( ) { | Descriptor |
|---|---|
|   for(j = 0; j < vps_atlas_count_minus1 + 1; j++ ) { | |
|     pv_packed_count_minus1[ j ] | u(4) |
|     for(i = 0; i < vps_atlas_count_minus1 + 1; i++ ) { | |
|       pv_codec_id[ j ][ i ] | u(8) |
|       pv_num_regions_minus1[ j ][ i ] | u(8) |
|       for( k = 0; k <= pv_num_regions_minus1[ j ][ i ]; k++ ) { | |
|         pv_region_type_id[ j ][ i ][ k ] | u(4) |
|         pv_region_top_left_x[ j ][ i ][ k ] | u(v) |
|         pv_region_top_left_y[ j ][ i ][ k ] | u(v) |
|         pv_region_width_minus1[ j ][ i ][ k ] | u(v) |
|         pv_region_height_minus1[ j ][ i ][ k ] | u(v) |
|       } | |
|     } | |
|   } | |
| } | |

In the packed_video( ) structure a definition pv_packed_count_minus1[j] plus one specifies the number of packed video bitstreams associated with the atlas with index j. pv_packed_count_minus1 shall be in the range of 0 to 15, inclusive.

In the packed_video( ) structure a definition pv_codec_id[j][i] indicates the identifier of the codec used to compress the packed video data with index i for the atlas with index j. pv_codec_id[j][i] shall be in the range of 0 to 255, inclusive. This codec may be identified through a component codec mapping SEI message.

In the packed_video( ) structure a definition pv_num_regions_minus1[j][i] plus 1 specifies the number of regions in a packed video bitstream with index i of atlas with index j. pv_num_regions_minus1 shall be in the range of 0 to 254.

In the packed_video( ) structure a definition pv_region_type_id[j][i][k] specifies type of region with index k in a packed video bitstream with index i of atlas with index j. In the following a list of possible region types is given. It is to be appreciated that the list is given for understanding purposes only, and should not be unnecessarily interpreted as a limiting list:

| pv_region_type_id [ j ][ i ] | Attribute type |
|---|---|
| 0 | Occupancy |
| 1 | Geometry |
| 2 | Texture |
| 3 | Material ID |
| 4 | Transparency |
| 5 | Reflectance |
| 6 | Normals |
| 7..15 | Reserved |

In the packed_video( ) structure a definition pv_region_top_left_x[j][i][k] specifies horizontal position of top left of k-th region in unit of luma samples.

In the packed_video( ) structure a definition pv_region_top_left_y[j][i][k] specifies vertical position of top left of k-th region in unit of luma samples.

In the packed_video( ) structure a definition pv_region_width_minus1[j][i][k] plus 1 specifies the width of k-th region in unit of luma samples.

In the packed_video( ) structure a definition pv_region_height_minus1[j][i][k] plus 1 specifies the height of k-th region in unit of luma samples According to another embodiment, packed_video( ) can also indicate in which color plane a packed data is present. In this case a video frame can be encoded as separate color planes (e.g. separate_colour_plane_flag set to 1 in HEVC see Table 6-1 of 23008-2, or in WC see Table 2 of 23090-3). This could be utilized for example for packing transparency and material ID in the same spatial region but on different planes. An example of this is given in a table below containing a definition pv_region_plane_id[j][i][k]

| packed_video( ) { | Descriptor |
|---|---|
|   for(j = 0; j < vps_atlas_count_minus1 + 1; j++ ) { | |
|     pv_packed_count_minus1[ j ] | u(8) |
|     for(i = 0; i < vps_atlas_count_minus1 + 1; i++ ) { | |
|       pv_codec_id[ j ][ i ] | u(8) |

-continued

```
packed_video( ) {                                          Descriptor
    pv_num_regions_minus1[ j ][ i ]                            u(8)
    for( k = 0; k <= pv_num_regions_minus1[ j ][ i ]; k++ ) {
        pv_region_type_id[ j ][ i ][ k ]                       u(4)
        pv_region_top_left_x[ j ][ i ][ k ]                    u(v)
        pv_region_top_left_y[ j ][ i ][ k ]                    u(v)
        pv_region_width_minus1[ j ][ i ][ k ]                  u(v)
        pv_region_height_minus1[ j ][ i ][ k ]                 u(v)
        pv_region_plane_id[ j ][ i ][ k ]                      u(2)
        }
    }
    }
}
```

In the table above, pv_region_plane_id[j][i][k] specifies the colour plane associated with of k-th region. The value of pv_region_plane_id shall be in the range of 0 to 3, inclusive. pv_region_plane_id values 1, 2 and 3 correspond to the Y, Cb and Cr planes, respectively. pv_region_plane_id value 0 indicates than all planes are associated with this region. These alternatives, which should not be unnecessarily interpreted as limiting examples, are listed in below:

| pv_region_plane_id | Description |
| --- | --- |
| 0 | in all planes |
| 1 | in "Red" plane |
| 2 | in "Green" plane |
| 3 | in "Blue" plane |

2. New Ai_Attribute_Type_Id Identifier

A new value for ai_attribute_type_id is defined to inform a decoder that the data in attributed video bitstream contains packed attributes. In the following table, which is a non-limiting example, the new value is 5 for an identifier ATTR_PACKED.

| ai_attribute_type_id[ j ][ i ] | Identifier | Attribute type |
| --- | --- | --- |
| 0 | ATTR_TEXTURE | Texture |
| 1 | ATTR_MATERIAL_ID | Material ID |
| 2 | ATTR_TRANSPARENCY | Transparency |
| 3 | ATTR_REFLECTANCE | Reflectance |
| 4 | ATTR_NORMAL | Normals |
| 5 | ATTR_PACKED | Packed |
| 6...14 | ATTR_RESERVED | Reserved |
| 15 | ATTR_UNSPECIFIED | Unspecified |

A new SEI message is further defined to provide information on how to interpret the new attribute. An example of such SEI message is shown below:

```
packed_attribute(payloadSize) {                            Descriptor
    pa_packed_attribute_count_minus1                           u(8)
    for(i = 0; i < vps_atlas_count_minus1 + 1; i++ ) {
        pa_attribute_index[ i ]                                u(8)
        pa_num_regions_minus1[ i ]                             u(8)
        for( k = 0; k <= pa num regions minus1 [ i ]; k++ )
    {
        pa_region_type_id[ i ][ k ]                            u(4)
        pa_region_top_left_x[ i ] [ k ]                        u(v)
        pa_region_top_left_y[ i ] [ k ]                        u(v)
        pa_region_width_minus1[ i ][ k ]                       u(v)
        pa_region_height_minus1[ i ][ k ]                      u(v)
        pa_region_plane_id[ i ][ k ]                           u(2)
```

```
                                                           -continued
packed_attribute(payloadSize) {                            Descriptor
    }
  }
}
```

In the packed_attribute( ) structure a definition pa_packed_attribute_count_minus1 plus one indicates the count of attributes of type packed.

In the packed_attribute( ) structure a definition pa_attribute_index[i] indicates the attribute index of the i-th packed video bitstream that the current SEI message signalling referred.

In the packed_attribute( ) structure a definition pa_num_regions_minus1[i] plus 1 specifies the number of regions in a packed video bitstream with index i. The value for pv_num_regions_minus1 shall be in the range of 0 to 254.

In the packed_attribute( ) structure a definition pa_region_type_id[i][k] specifies type of region with index k in a packed video bitstream with index i. Table below describes the list of possible region types. It is to be appreciated that the list should not be unnecessarily interpreted as limiting, but the values for various attribute types may vary.

| pa_region_type_id [ j ][ i ] | Attribute type |
| --- | --- |
| 0 | Texture |
| 1 | Material ID |
| 2 | Transparency |
| 3 | Reflectance |
| 4 | Normals |
| 5..15 | Reserved |

In the packed_attribute( ) structure a definition pa_region_top_left_x[i][k] specifies horizontal position of top left of k-th region in unit of luma samples.

In the packed_attribute( ) structure a definition pa_region_top_left_y[i][k] specifies vertical position of top left of k-th region in unit of luma samples.

In the packed_attribute( ) structure a definition pa_region_width_minus1[i][k] plus 1 specifies the width of k-th region in unit of luma samples.

In the packed_attribute( ) structure a definition pa_region_height_minus1[i][k] plus 1 specifies the height of k-th region in unit of luma samples In the packed_attribute( ) structure a definition pa_region_plane_id[i][k] specifies the colour plane associated with of k-th region. The value of pv_region_plane_id shall be in the range of 0 to 3, inclusive. pv_region_plane_id values 1, 2 and 3 correspond to the Y, Cb and Cr planes, respectively. pv_region_plane_id value 0 indicates than all planes are associated with this region. Table below describes the list of possible region planes. It is to be appreciated that the list should not be unnecessarily interpreted as limiting, but the values for various attribute types may vary.

| pa_region_plane_id | Description |
|---|---|
| 0 | in all planes |
| 1 | in Y plane |
| 2 | in Cb plane |
| 3 | in Cr plane |

3. New Packed_Patches( ) Syntax Structure

With the packing of different components to one video frame, atlas_sequence_parameter_set( ) provides information on how to differentiate patches and link them together. This is accomplished by defining a new extension mechanism that is signalled by aps_packed_patches_extension_flag. When this flag is set, a packed_patches( ) structure is provided in atlas_sequence_parameter_set( ).

| atlas_sequence_parameter_set_rbsp( ) { | Descriptor |
|---|---|
| asps_atlas_sequence_parameter_set_id | ue(v) |
| asps_frame_width | u(16) |
| asps_frame_height | u(16) |
| asps_vui_parameters_present_flag | u(1) |
| ... | |
| if( asps_vui_parameters_present_flag) | |
|   vui_parameters( ) | |
| aps_packed_patches_extension_flag | u(1) |
| if(aps_packed_patches_extension_flag) | |
|   packed_patches( ) | |
| asps_extension_present_flag | u(1) |
| if( asps_extension_present_flag) | |
|   while(more_rbsp_data( )) | |
|     asps_extension_data_flag | u(1) |
| rbsp_trailing_bits( ) | |
| } | |

According to an embodiment, tile groups of atlas data are aligned with regions in packed video frames and are constant throughout the coded atlas sequence. In each tile group, patch indexes are independent, which means that they have been counted from 0. When aps_packed_patches_extension_ flag is set to 1, then patch with index X in tile group 0 correspond to all other patches with index X in all other tile groups with indices 1 to N.

Figure 6:
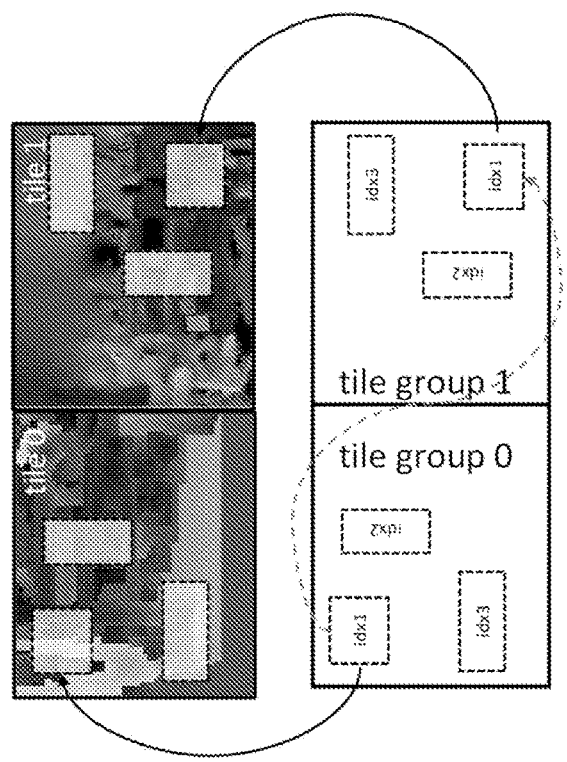
FIG. 6 shows an example of geometry and texture packed to one video frame and patch data packet in tile groups that correspond to packet regions.
Figure 6:
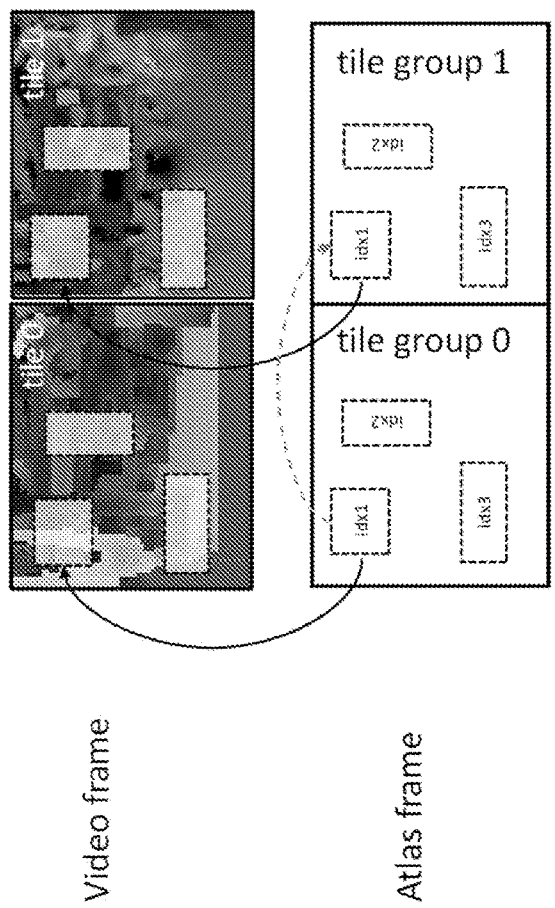

FIG. 6 shows an example of how geometry and texture may be frame packed to one video frame and patch data may be packed in tile groups that correspond to packed regions, and how these are signaled. FIG. 6 shows two different tile groups (tile group 0, tile group 1) for different components (geometry and texture, respectively). The patches inside the tile groups may be signaled separately or the same patch-layout may be used. In this example, the same patch identification (idx1, idx2, idx3) between these groups (tile group 0, tile group 1) represents the same patch.

Attribute (texture) related patches should not contain any information (e.g. value should be 0) related to 3D (e.g. field pdu_3d_pos_x, pdu_3d_pos_y, pdu_3d_pos_min_z, pdu_3d_pos_delta_max_z, pdu_lod) and a decoder should not try to interpret that information.

It is to be appreciated that when there is more than one video bitstream in vpcc sequence, and each of the video bitstream would contain different packing, then other methods can be utilized to carry mixed patch packing layout.

| packed_patches( ) { | Descriptor |
|---|---|
| pp_tile_groups_count_minus1 | u(8) |
| for(i = 0; i < pp_tile_groups_count_minus1 + 1; i++ ) { | |
|   pp_tile_group_id[ i ] | u(8) |
|   pp_tile_group_type[ i ] | u(8) |
| } | |
| } | |

In the packed_patches( ) structure a definition pp_tile_groups_count_minus1 plus one specifies the number of tile groups.

In the packed_patches( ) structure a definition pp_tile_group_id[i] specifies tile group id.

In the packed_patches( ) structure a definition pp_tile_group_type[i] specifies type of patches in that tile group with pp_tile_group_id[i]. An example of values for pp_tile_group_id is given in the table below, which should not be unnecessarily interpreted as limiting:

| pp_tile_group_type | Description |
|---|---|
| 0 | 3D patches all data provided by patch_information_data( ) should be interpreted by the decoded |
| 1 | 2D patches only data related to the position and orientation of the patch in video frame should be interpreted by the decoder (the 3D information is provided by patches in tile group type 0) |

Figure 8B:
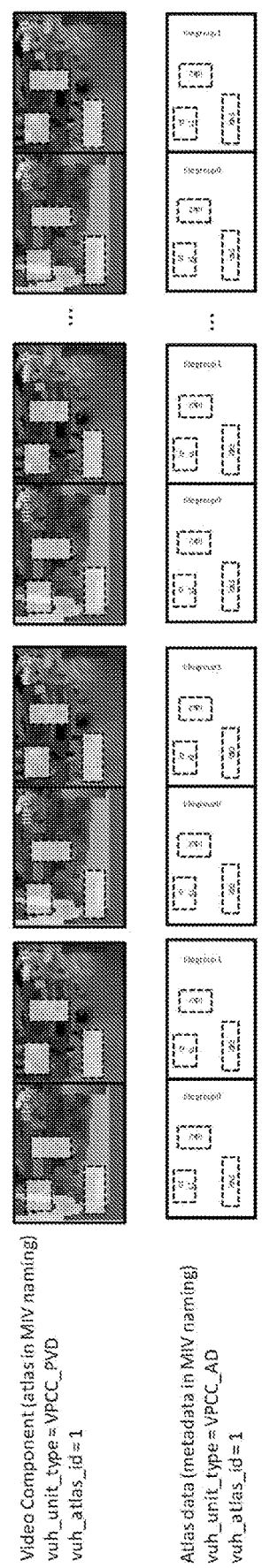

According to an embodiment, tile groups of atlas data may be aligned with regions in packed video frames and may be constant throughout coded atlas sequence. Tile groups with no patch data may also exist. packed_patches( ) structure provides information on how to interpret patches and from where patches can be copied, if needed. FIG. 8b shows an example on packed_patches( ) informing how to interpret atlas data.

Figure 7:
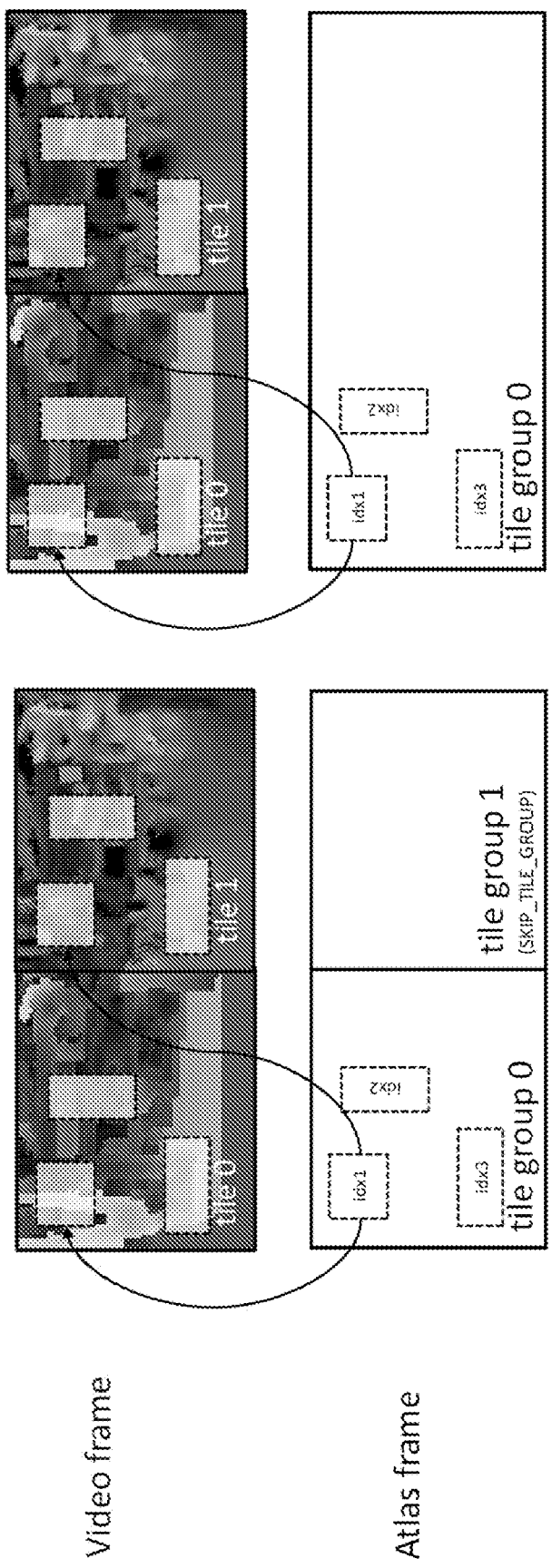
FIG. 7 shows an example of a geometry and texture packed to one video frame and patch data packed in one tile group.

FIG. 7 illustrates an example of geometry and texture packed to one video frame and patch data packed in one tile group. Regions can copy data from other tile groups. The difference of FIG. 7 compared to FIG. 6 is that the patches between tile groups (tile group 0, tile group 1) share the same layout. Patch in geometry tile group (tile group 0) is found in the same place in the texture. This allows signaling empty tile group, i.e. SKIP_TILE_GROUP, instead of explicitly signaling the position of the patch in the other tile group.

It is to be noticed that when there is more than one video bitstream in vpcc sequence, and each of the video bitstreams contains different packing, then other methods can be utilized to carry mixed patch packing layout.

In the following an example of packed_patches( ) structure is shown:

| packed_patches( ) { | Descriptor |
|---|---|
| pp_tile_groups_count_minus1 | u(8) |
| for(i = 0; i < pp_tile_groups_count_minus1 + 1; i++ ) { | |
|   pp_tile_group_id[ i ] | u(8) |
|   pp_tile_group_type[ i ] | u(8) |
|   if(pp_tile_group_type[i] == 2) | |
|     pp_source_tile_group_id[ i ] | |
|     pp_copy_type[ i ] | |
| } | |
| } | |

In the packed_patches( ) structure a definition pp_tile_groups_count_minus1 plus one specifies the number of tile groups.

In the packed_patches( ) structure a definition pp_tile_group_id [i] specifies tile group identification.

In the packed_patches( ) structure a definition pp_tile_group_type [i] specifies type of patches in that tile group with it pp_tile_group_id[i]. Non-limiting examples of possible pp_tile_group_type values are given below:

| pp_tile_group_type | Description |
| --- | --- |
| 0 | 3D patches all data provided by patch_information_data( ) should be interpreted by the decoded |
| 1 | 2D patches only data related to the position and orientation of the patch in video frame should be interpreted by the decoder (the 3D information is provided by patches in tile group type 0) |
| 2 | Tile group does not contain any patch data. Patch data should be copied from other tile group indicated pp_source_tile_group_id |

In the packed_patches( ) structure a definition pp_source_tile_group_id[i] specifies an identification for a tile group from which patch data should be copied for tile group having an identification equal to pp_tile_group_id In the packed_patches( ) structure a definition pp_copy_type[i] specifies what type information should be copied from the source tile group and how tile group with identification equal to pp_tile_group_id shall be interpreted

| pp_copy_type | Description |
| --- | --- |
| 0 | copy all data |
| 1 | copy only 2D related data |

According to another embodiment the patch_packed( ) information is carried in atlas_frame_parameter_set and can change on frame to frame basis.

4. New Patch Modes in Patch Information Data and New Patch Data Unit Structures.

In this example a new vuh_unit_type VPCC_PVD is defined to indicate that VPCC unit contain video bitstream containing patch data from different components.

With the definition of new VPCC unit type vpcc_parameter_set( ) contains packed_video( ) structure that provides information only about the codec being used for encoding the video. A non-limiting example of a structure of packed_video is given in the following:

| packed_video( ) { | Descriptor |
| --- | --- |
| for(j = 0; j < vps_atlas_count_minus1 + 1; j++ ) { | |
| pv_packed_count_minus1[ j ] | u(4) |
| for(i = 0; i < vps_atlas_count_minus1 + 1; i++ ) { | |
| pv_codec_id[ j ][ i ] | u(8) |
| } | |
| } | |
| } | |

In the packed_video( ) structure a definition pv_packed_count_minus1[j] plus one specifies the number of packed video bitstreams associated with the atlas with index j. pv_packed_count_minus1 shall be in the range of 0 to 15, inclusive.

In the packed_video( ) structure a definition pv_codec_id [j][i] indicates the identifier of the codec used to compress the packed video data with index i for the atlas with index j. pv_codec_id[j][i] shall be in the range of 0 to 255, inclusive. This codec may be identified through a component codec mapping SEI message or through other means.

To indicate components which the patches belong to, and the relation between patches, new patch modes and new patch unit structures are defined.

The following table lists patch mode types for I_TILE_GRP type atlas tile groups:

| atgdu_patch_mode | Identifier | Description |
| --- | --- | --- |
| 0 | I_INTRA | Non-predicted Patch mode |
| 1 | I_RAW | RAW Point Patch mode |
| 2 | I_EOM | EOM Point Patch mode |
| 3 | I_PACKED | Packed Patch mode |
| 4-13 | I_RESERVED | Reserved modes |
| 14 | 1_END | Patch termination mode |

The following table lists patch mode types for P TILE GRP type atlas tile groups:

| atgdu_patch_mode | Identifier | Description |
| --- | --- | --- |
| 0 | P_SKIP | Patch Skip mode |
| 1 | P_MERGE | Patch Merge mode |
| 2 | P_INTER | Inter predicted Patch mode |
| 3 | P_INTRA | Non-predicted Patch mode |
| 4 | P_RAW | RAW Point Patch mode |
| 5 | P_EOM | EOM Point Patch mode |
| 6 | P_INTER PACKED | Packed Patch mode |
| 7 | P_INTRA PACKED | Packed Patch mode |
| 8-13 | P_RESERVED | Reserved modes |
| 14 | P_END | Patch termination mode |

A non-limiting example of a structure of patch_information_data is given in the following:

| patch_information_data ( patchIdx, patchMode ) { | Descriptor |
| --- | --- |
| if ( atgh_type = = SKIP_TILE_GR ) | |
| skip_patch_data_unit( patchIdx ) | |
| else if ( atgh_type = = P_TILE_GR ) { | |
| if(patchMode = = P_SKIP ) | |
| skip_patch_data_unit( patchIdx ) | |
| else if(patchMode = = P_MERGE ) | |
| merge_patch_data_unit( patchIdx ) | |
| else if( patchMode = = P_INTRA ) | |
| patch_data_unit( patchIdx ) | |
| else if( patchMode = = P_INTER) | |
| inter_patch_data_unit( patchIdx ) | |
| else if( patchMode = = P_RAW ) | |
| raw_patch_data_unit( patchIdx ) | |
| else if( patchMode = = P_EOM ) | |
| eom_patch_data_unit( patchIdx ) | |
| else if( patchMode = = P_INTRA_PACKED ) | |
| packed_patch_data_unit( patchIdx ) | |
| else if( patchMode = = P_INTER_PACKED) | |
| inter_packed_patch_data_unit( patchIdx ) | |
| } | |
| else if ( atgh_type = = I_TILE_GR ) { | |
| if( patchMode = = I_INTRA ) | |
| patch_data_unit( patchIdx ) | |
| else if( patchMode = = I_RAW ) | |
| raw_patch_data_unit( patchIdx ) | |
| else if( patchMode = = I_EOM ) | |
| eom_patch_data_unit( patchIdx ) | |
| else if( patchMode = = I_PACKED ) | |

-continued

| patch_information_data ( patchIdx, patchMode ) { | Descriptor |
|---|---|
|     packed_patch_data_unit( patchIdx ) | |
|   } | |
| } | |

A non-limiting example of a structure of packed_patch_data_unit is given in the following:

| packed_patch_data_unit( patchIdx ) { | Descriptor |
|---|---|
|   ppdu_2d_pos_x[ patchIdx ] | u(v) |
|   ppdu_2d_pos_x [ patchIdx ] | u(v) |
|   ppdu_2d_delta_size_x[ patchIdx ] | se(v) |
|   ppdu_2d_delta_size_y[ patchIdx ] | se(v) |
|   ppdu_3d_info_tile_group_id[patchIdx ] | u(8) |
|   ppdu_3d_patch_index[ patchIdx ] | u(8) |
|   ppdu_data_type_id[ patchIdx ] | u(8) |
| } | |

Semantics for ppdu_2d_pos_x, ppdu_2d_pos_x, ppdu_2d_delta_size_x, ppdu_2d_delta_size_y are the same as in pach_data_unit and provide 2d position of a patch.

In the packed_patch_data_unit( ) structure a definition ppdu_3d_info_tile_group_id[j] specifies the id of a tile group in which the related patch data with 3d information is present.

In the packed_patch_data_unit( ) structure a definition ppdu_3d_info_patch_index[j] specifies the index of a patch in tile group indicated by ppdu_3d_info_tile_group_id[j] that contains the related patch data with 3d information.

In the packed_patch_data_unit( ) structure a definition ppdu_data_type[j] specifies type of data the patch contains in a packed video bitstream. Table below describes the list of possible region types, which should not be unnecessarily interpreted as limiting examples. It is to be also noticed that geometry data may be described by the standard patch_data_unit( )

| ppdu_data_type [ j ][ i ] | data type |
|---|---|
| 0 | Occupancy |
| 1 | Texture |
| 2 | Material ID |
| 3 | Transparency |
| 4 | Reflectance |
| 5 | Normals |
| 6..15 | Reserved |

A non-limiting example of a structure of inter_packed_patch_data_unit is given in the following:

| inter_packed_patch_data_unit( patchIdx ) { | Descriptor |
|---|---|
|   ippdu_2d_pos_x[ patchIdx ] | u(v) |
|   ippdu_2d_pos_x [ patchIdx ] | u(v) |
|   ippdu_2d_delta_size_x[ patchIdx ] | se(v) |
|   ippdu_2d_delta_size_y[ patchIdx ] | se(v) |
|   ippdu_3d_info_tile_group_id[ patchIdx ] | u(8) |
|   ippdu_3d_patch_index[ patchIdx ] | u(8) |
|   ippdu_data_type_id[ patchIdx ] | u(8) |
| } | |

Semantics for ippdu_2d_pos_x, ippdu_2d_pos_x, ippdu_2d_delta_size_x, ippdu_2d_delta_size_y are the same as in inter_pach_data_unit and provide 2d position of a patch.

Semantics for ippdu_3d_info_tile_group_id, ippdu_3d_patch_index, ippdu_data_type_id are the same as in packed_pach_data_unit( )

According to an embodiment, ippdu_data_type_id, ppdu_data_type_id fields are not present in inter_packed_patch_data_unit, and packed_patch_data_unit, respectively. The type of data (e.g. color, geometry, etc.) in a given patch may be deducted based on the region the patch is in. Regions of a video frames and their type are signalled in patch_video( ) structure which is part of vpcc_parameter_set( )

It is to be noticed that the structures and semantics of the packed_video( ) are the same as in previous embodiments.

| packed_video( ){ | Descriptor |
|---|---|
|   for(j = 0; j < vps_atlas_count_minus1 + 1; j++) { | |
|     pv_packed_count_minus1[ j ] | u(4) |
|     for(i = 0; i < vps_atlas_count_minus1 + 1; i++ ) { | |
|       pv_codec_id[ j ][ i ] | u(8) |
|       pv_num_regions_minus1[ j ][ i ] | u(8) |
|       for( k = 0; k <= pv_num_regions_minus1[ j ][ i ]; k++ ) { | |
|         pv_region type_id[ j ][ i ][ k ] | u(4) |
|         pv_region_top_left_x[ j ][ i ][ k ] | u(v) |
|         pv_region_top_left_y[ j ][ i ][ k ] | u(v) |
|         pv_region_width_minus1[ j ][ i ][ k ] | u(v) |
|         pv_region_height_minus1[ j ][ i ][ k ] | u(v) |
|       } | |
|     } | |
|   } | |
| } | |

5. New SEI Message for Flexible Metadata Signalling

According to an embodiment a new SEI message may be introduced in atlas_sub_bitstream, which identifies the video encoded bitstream to which the following or preceding metadata relates to. As an example, the new SEI message may precede a patch layout related information like atlas_tile_group_layer_rbsp( ) in which case the following NAL units are applied to specific video component, attribute or atlas that is contained in another video encoded bitstream. This design allows flexible storage of patches of certain type in another video track of another type. A non-limiting example of a structure of separate_atlas_component is given in the following:

| separate_atlas_component( payloadSize ) { | Descriptor |
|---|---|
| component_type | u(5) |
| attribute_index | u(7) |
| atlas_id | u(6) |
| metadata_component_type | u(5) |
| metadata_attribute_index | u(7) |
| metadata_atlas_id | u(6) |
| } | |

In the separate_atlas_component structure a definition component_type signals the video encoded component type which is needed to identify a specific video encoded bitstream.

In the separate_atlas_component structure a definition attribute_index signals the video encoded attribute type which is needed to identify a specific video encoded bitstream.

In the separate_atlas_component structure a definition atlas_id signals the video encoded atlas id which is needed to identify a specific video encoded bitstream.

In the separate_atlas_component structure a definition metadata_component_type shall signal the component type to which the following or preceding NAL units should be applied to. When signalling patches this parameter identifies the type of the patch or patch tile group.

In the separate_atlas_component structure a definition metadata_attribute_index shall signal the attribute_index to which the following or preceding NAL units should be applied to. When signalling patches this parameter identifies the attribute index of the patch or patch tile group. This information is optional and is only needed, if patches from different attribute index should be packed together.

In the separate_atlas_component structure a definition metadata_atlas_id shall signal the atlas index to which the following or preceding NAL units should be applied to. When signalling patches this parameter identifies the atlas index of the patch or patch tile group. This information is optional and should be only used, if atlases with different index should be packed in the same video encoded bitstream.

Figure 9:
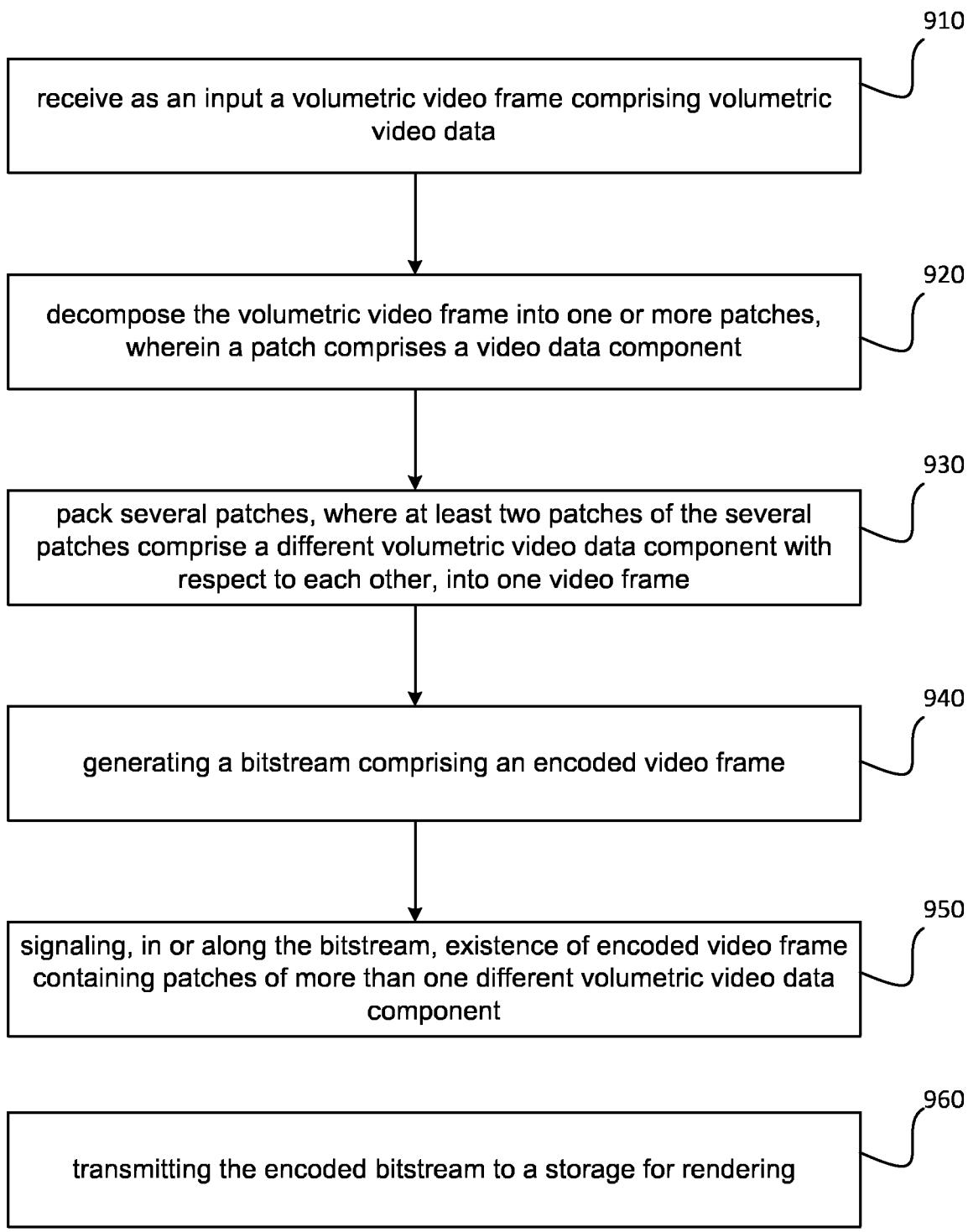
FIG. 9 is a flowchart illustrating a method according to an embodiment.

A method according to an embodiment is shown in FIG. 9. The method generally comprises receiving 910 as an input a volumetric video frame comprising volumetric video data; decomposing 920 the volumetric video frame into one or more patches, wherein a patch comprises a video data component; packing 930 several patches, where at least two patches of the several patches comprise a different volumetric video data component with respect to each other, into one video frame; generating 940 a bitstream comprising an encoded video frame; signaling 950, in or along the bitstream, existence of encoded video frame containing patches of more than one different volumetric video data component; and transmitting 960 the encoded bitstream to a storage for rendering.

An apparatus according to an embodiment comprises means for receiving as an input a volumetric video frame comprising volumetric video data; means for decomposing the volumetric video frame into one or more patches, wherein a patch comprises a volumetric video data component; means for packing several patches, where at least two patches of the several patches comprise a different volumetric video data component with respect to each other, into one video frame; means for generating a bitstream comprising an encoded video frame; means for signaling, in or along the bitstream, existence of encoded video frame containing patches of more than one different volumetric video data component; and means for transmitting the encoded bitstream to a storage for rendering. The means comprises at least one processor, and a memory including a computer program code, wherein the processor may further comprise processor circuitry. The memory and the computer program code are configured to, with the at least one processor, cause the apparatus to perform the method according to various embodiments.

Figure 10:
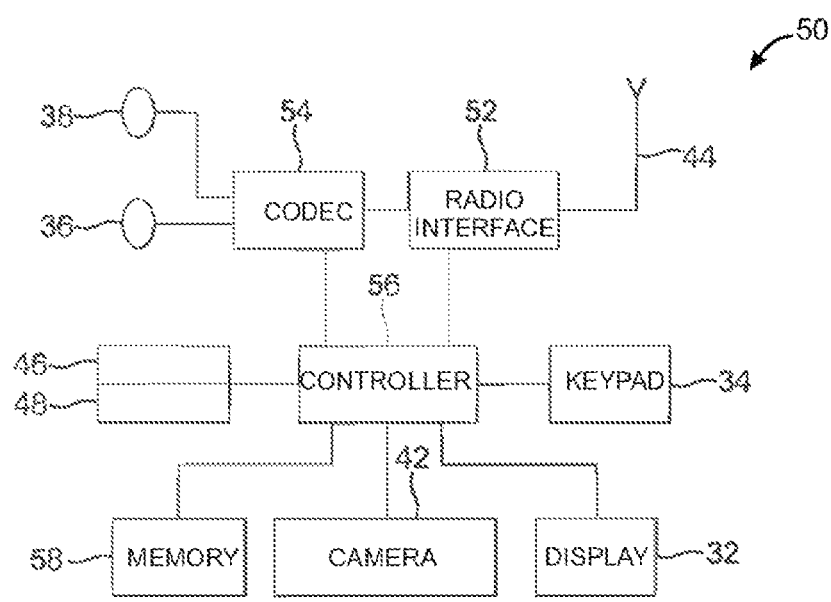
FIG. 10 shows an apparatus according to an embodiment.

An example of an apparatus is disclosed with reference to FIG. 10. FIG. 10 shows a block diagram of a video coding system according to an example embodiment as a schematic block diagram of an electronic device 50, which may incorporate a codec. In some embodiments the electronic device may comprise an encoder or a decoder. The electronic device 50 may for example be a mobile terminal or a user equipment of a wireless communication system or a camera device. The electronic device 50 may be also comprised at a local or a remote server or a graphics processing unit of a computer. The device may be also comprised as part of a head-mounted display device. The apparatus 50 may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera 42 capable of recording or capturing images and/or video. The camera 42 may be a multi-lens camera system having at least two camera sensors. The camera is capable of recording or detecting individual frames which are then passed to the codec 54 or the controller for processing. The apparatus may receive the video and/or image data for processing from another device prior to transmission and/or storage.

The apparatus 50 may comprise a controller 56 or processor for controlling the apparatus 50. The apparatus or the controller 56 may comprise one or more processors or processor circuitry and be connected to memory 58 which may store data in the form of image, video and/or audio data, and/or may also store instructions for implementation on the controller 56 or to be executed by the processors or the processor circuitry. The controller 56 may further be connected to codec circuitry 54 suitable for carrying out coding and decoding of image, video and/or audio data or assisting in coding and decoding carried out by the controller.

The apparatus 50 may further comprise a card reader 48 and a smart card 46, for example a UICC (Universal Integrated Circuit Card) and UICC reader for providing user information and being suitable for providing authentication information for authentication and authorization of the user at a network. The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es). The apparatus may comprise one or more wired interfaces configured to transmit and/or receive data over a wired connection, for example an electrical cable or an optical fiber connection.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises receiving as an input a volumetric video frame comprising volumetric video data; decomposing the volumetric video frame into one or more patches, wherein a patch comprises a video data component; packing several patches, where at least two patches of the several patches comprise a different volumetric video data component with respect to each other, into one video frame; generating a bitstream comprising an encoded video frame; signaling, in or along the bitstream, existence of encoded video frame containing patches of more than one different volumetric video data component; and transmitting the encoded bitstream to a storage for rendering.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus comprising:
    at least one processor; and
    at least one memory storing instructions that, when executed by the at least one processor, cause the apparatus at least to:
    receive, as an input, a volumetric video frame comprising volumetric video data;
    decompose the volumetric video frame into one or more patches, wherein a patch comprises a volumetric video data component;
    pack two or more patches, where at least two patches of the two or more patches comprise a different volumetric video data component with respect to each other, into one video frame to generate a packed video frame;
    wherein the volumetric video component of a first patch of the at least two patches packed into the one video frame comprises one of an occupancy component, a geometry component, or an attribute component, and a second patch of the at least two patches packed into the one video frame comprises a different one of the occupancy component, the geometry component, or the attribute component;
    wherein the first patch is in a first region of the one video frame, the first region comprising the one of the occupancy component, the geometry component, or the attribute component of the first patch, and the second patch is in a second region of the one video frame, the second region comprising the different one of the occupancy component, the geometry component, or the attribute component of the second patch;
    generate a bitstream comprising an encoded video frame comprising the packed video frame;
    signal, in or along the bitstream, existence of the encoded video frame comprising patches of more than one different volumetric video data component including at least the first patch in the first region of the one video frame and the second patch in the second region of the one video frame; and
    transmit the encoded bitstream for rendering.

2. The apparatus according to claim 1, wherein the volumetric video data component comprises one of the following: geometry data, or attribute data.

3. The apparatus according to claim 1, wherein said signaling is configured to be provided in at least one structure of a video-based point cloud compression bitstream.

4. The apparatus according to claim 1, wherein the bitstream comprises a signal indicating a linkage between atlas data and packed video data.

5. The apparatus according to claim 1, wherein the apparatus is further caused to: encode a type of the volumetric video data component into atlas data.

6. The apparatus according to claim 1, wherein the apparatus is further caused to: map a patch to video frame packing regions signaled in the bitstream.

7. The apparatus according to claim 1, wherein the apparatus is further caused to: indicate in the bitstream that the video frame comprises patches comprising more than one attribute data.

8. The apparatus according to claim 7, wherein the attribute data comprises at least one of the following: texture, material identification, transparency, reflectance, or normal.

9. The apparatus according to claim 1, wherein the apparatus is further caused to: encode into the bitstream an indication on how patches are differentiated and linked together.

10. The apparatus according to claim 1, wherein the apparatus is further caused to: generate a structure comprising information about packing regions.

11. The apparatus according to claim 1, wherein the apparatus is further caused to: encode the video frame as separate color planes.

12. The apparatus according to claim 1, wherein the apparatus is further caused to: encode into a bitstream information about a codec being used for encoding the video frame.

13. The apparatus according to claim 1, wherein the apparatus is further caused to: generate a structure identifying the encoded bitstream to which a metadata is related to.

14. The apparatus of claim 1, wherein the packed video frame is of an atlas identified with an atlas identifier, and the apparatus is further caused to:
  signal, with a geometry syntax element, an indication that the packed video frame of the atlas identified with an atlas identifier comprises a region with geometry data; and
  signal, with an attribute syntax element, another indication that the packed video frame of the atlas identified with the atlas identifier comprises another region with attribute data.

15. The apparatus of claim 1, wherein the apparatus is further caused to: signal, in or along the bitstream, an indication that the atlas identified with the atlas identifier comprises packed video data associated with the atlas.

16. The apparatus of claim 1, wherein the apparatus is further caused to:
  signal a packing information flag that specifies whether a packing information syntax structure is present within a parameter set syntax structure;
  wherein the packing information syntax structure provides a linking of the atlas identified with the atlas identifier with the packed video frame;
  wherein the packing information syntax structure provides information about the different volumetric video data components packed into the encoded video frame;
  wherein the information about the different volumetric video data components packed into the encoded video frame comprises information relate to how to interpret the different volumetric video data components packed into the encoded video frame.

17. The apparatus of claim 1, wherein the apparatus is further caused to: indicate, with a packed video data volumetric unit header unit type, that a volumetric unit comprises packed video data comprising patches associated with different volumetric video data components.

18. The apparatus of claim 1, wherein the apparatus is further caused to:
  signal, with a horizontal top left syntax element, information that specifies a horizontal position of a top left sample of one region identified with a region index for the atlas identified with the atlas identifier in the packed video frame;
  signal, with a vertical top left syntax element, information that specifies a vertical position of the top left sample of the one region identified with the region index for the atlas identified with the atlas identifier in the packed video frame;
  signal, with a width syntax element, information that specifies a width of the one region identified with the region index for the atlas identified with the atlas identifier in the packed video frame; and
  signal, with a height syntax element, information that specifies a height of the one region identified with the region index for the atlas identified with the atlas identifier in the packed video frame.

19. The apparatus of claim 1, wherein the apparatus is further caused to: signal, with an attribute number syntax element, information that indicates a number of attributes present in the packed video frame.

20. The apparatus of claim 1, wherein the apparatus is further caused to: signal, with an attribute type syntax element, information that indicates an attribute type of an attribute for the atlas identified with the atlas identifier, wherein the information indicates the attribute type with a value.

21. The apparatus of claim 20, wherein:
  when the value is 0, the value indicates that the attribute type is texture;
  when the value is 1, the value indicates that the attribute type is material ID;
  when the value is 2, the value indicates that the attribute type is transparency;
  when the value is 3, the value indicates that the attribute type is reflectance; and
  when the value is 4, the value indicates that the attribute type is normals.

22. The apparatus of claim 1, wherein the apparatus is further caused to: signal, with a codec identifier syntax element, information that indicates an identifier of a codec used for processing the packed video frame for the atlas identified with the atlas identifier.

23. The apparatus of claim 1, where the atlas corresponds to a volume in three-dimensional space on which the volumetric video data component is rendered.

24. A non-transitory computer readable medium comprising instructions stored thereon for performing at least the following:
  receiving, as an input, a volumetric video frame comprising volumetric video data;
  decomposing the volumetric video frame into one or more patches, wherein a patch comprises a volumetric video data component;
  packing two or more patches, wherein at least two patches of the two or more patches comprise a different volumetric video data component with respect to each other, into one video frame to generate a packed video frame;
  wherein the volumetric video component of a first patch of the at least two patches packed into the one video frame comprises one of an occupancy component, a geometry component, or an attribute component, and a second patch of the at least two patches packed into the one video frame comprises a different one of the occupancy component, the geometry component, or the attribute component;
  wherein the first patch is in a first region of the one video frame, the first region comprising the one of the occupancy component, the geometry component, or the attribute component of the first patch, and the second patch is in a second region of the one video frame, the second region comprising the different one of the occupancy component, the geometry component, or the attribute component of the second patch;
  generating a bitstream comprising an encoded video frame comprising the packed video frame;
  signaling, in or along the bitstream, existence of the encoded video frame comprising patches of more than one different volumetric video data component including at least the first patch in the first region of the one video frame and the second patch in the second region of the one video frame; and
  transmitting the encoded bitstream for rendering.

25. A method, comprising:
  receiving, as an input, a volumetric video frame comprising volumetric video data;

decomposing the volumetric video frame into one or more patches, wherein a patch comprises a volumetric video data component;

packing two or more patches, wherein at least two patches of the two or more patches comprise a different volumetric video data component with respect to each other, into one video frame to generate a packed video frame;

wherein the volumetric video component of a first patch of the at least two patches packed into the one video frame comprises one of an occupancy component, a geometry component, or an attribute component, and a second patch of the at least two patches packed into the one video frame comprises a different one of the occupancy component, the geometry component, or the attribute component;

wherein the first patch is in a first region of the one video frame, the first region comprising the one of the occupancy component, the geometry component, or the attribute component of the first patch, and the second patch is in a second region of the one video frame, the second region comprising the different one of the occupancy component, the geometry component, or the attribute component of the second patch;

generating a bitstream comprising an encoded video frame comprising the packed video frame;

signaling, in or along the bitstream, existence of the encoded video frame comprising patches of more than one different volumetric video data component including at least the first patch in the first region of the one video frame and the second patch in the second region of the one video frame; and transmitting the encoded bitstream for rendering.

* * * * *